(12) United States Patent
Faccin et al.

(10) Patent No.: US 9,516,567 B2
(45) Date of Patent: Dec. 6, 2016

(54) METHODS AND APPARATUS TO HANDLE BEARERS DURING CIRCUIT SWITCHED FALLBACK OPERATION

(71) Applicant: BlackBerry Limited, Waterloo (CA)

(72) Inventors: Stefano Faccin, San Francisco, CA (US); Wei Wu, San Jose, CA (US); Chen Ho Chin, Deerlijk (BE)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/736,033

(22) Filed: Jun. 10, 2015

(65) Prior Publication Data

US 2015/0282029 A1 Oct. 1, 2015

Related U.S. Application Data

(62) Division of application No. 13/662,123, filed on Oct. 26, 2012, now abandoned.

(Continued)

(51) Int. Cl.
*H04W 36/14* (2009.01)
*H04W 36/00* (2009.01)
(Continued)

(52) U.S. Cl.
CPC ........... *H04W 36/14* (2013.01); *H04W 28/085* (2013.01); *H04W 36/0022* (2013.01); *H04W 36/24* (2013.01)

(58) Field of Classification Search
CPC ...... H04W 48/18; H04W 36/14; H04W 24/02; H04W 40/02; H04W 88/06; H04W 36/0022; H04W 36/24; H04W 28/085; H04L 12/56; H04L 45/22
See application file for complete search history.

(56) References Cited

U.S. PATENT DOCUMENTS

| | | | |
|---|---|---|---|
| 2007/0143613 A1* | 6/2007 | Sitch et al. | 713/171 |
| 2009/0047922 A1* | 2/2009 | Buckley et al. | 455/404.1 |

(Continued)

FOREIGN PATENT DOCUMENTS

| | | | |
|---|---|---|---|
| WO | 2010/109862 | * | 9/2010 |
| WO | 2010127435 | | 11/2010 |
| WO | 2011075240 | | 6/2011 |

OTHER PUBLICATIONS

Aso et al., "Routing Method, Routing System, Mobile Node, Home Agent, and Home Base Station", Sep. 30, 2010, WO WO 2010/109862, machine translation.*

(Continued)

*Primary Examiner* — Pao Sinkantarakorn
*Assistant Examiner* — Michael Phillips
(74) *Attorney, Agent, or Firm* — Fish & Richardson P.C.

(57) ABSTRACT

Methods and apparatus to provide packet switched service continuity during circuit switched fallback operation are described. One example method includes determining a set of access technologies available to a User Equipment (UE); identifying a WLAN access network from the set of access technologies; identifying a 3GPP RAT from the set of access technologies; prioritizing the WLAN access network type with respect to types of 3GPP RAT; and selecting one access technology from amongst the identified WLAN access network and the 3GPP RAT according to the prioritizing.

18 Claims, 16 Drawing Sheets

Related U.S. Application Data

(60) Provisional application No. 61/552,875, filed on Oct. 28, 2011.

(51) Int. Cl.
*H04W 28/08* (2009.01)
*H04W 36/24* (2009.01)

(56) References Cited

U.S. PATENT DOCUMENTS

| | | | |
|---|---|---|---|
| 2009/0196255 A1 | 8/2009 | Gulbani et al. | |
| 2010/0165940 A1 | 7/2010 | Watfa et al. | |
| 2010/0208624 A1* | 8/2010 | Vikberg | H04W 68/12 370/259 |
| 2010/0246530 A1* | 9/2010 | Pehrsson | H04W 36/0022 370/331 |
| 2010/0265884 A1* | 10/2010 | Vikberg | H04W 4/14 370/328 |
| 2010/0278142 A1 | 11/2010 | Dwyer et al. | |
| 2010/0316000 A1* | 12/2010 | Burbidge | H04W 36/0022 370/328 |
| 2011/0002268 A1 | 1/2011 | Dwyer et al. | |
| 2011/0103277 A1 | 5/2011 | Watfa et al. | |
| 2011/0149853 A1 | 6/2011 | Olsson et al. | |
| 2011/0170517 A1 | 7/2011 | Bakker et al. | |
| 2011/0176500 A1 | 7/2011 | Wager et al. | |
| 2011/0176512 A1 | 7/2011 | Sun | |
| 2011/0188451 A1 | 8/2011 | Song et al. | |
| 2011/0207481 A1 | 8/2011 | Yin et al. | |
| 2011/0274038 A1 | 11/2011 | Zhu et al. | |
| 2012/0039303 A1 | 2/2012 | Stenfelt et al. | |
| 2012/0051295 A1* | 3/2012 | Ergen | 370/329 |
| 2012/0064901 A1* | 3/2012 | Zhu et al. | 455/450 |
| 2012/0069817 A1 | 3/2012 | Ling et al. | |
| 2012/0182912 A1 | 7/2012 | Watfa et al. | |
| 2012/0188949 A1* | 7/2012 | Salkintzis et al. | 370/329 |
| 2014/0036873 A1* | 2/2014 | Cheng | H04W 36/0022 370/331 |
| 2014/0177599 A1 | 6/2014 | Tao | |

OTHER PUBLICATIONS

"3rd Generation Partnership Project; Technical Specification Group Services and System Aspects; Architecture Enhancements for Non-3GPP Accesses (Release 11 )," 3GPP TS 23.402 V11.0.0, Sep. 2011 (232 pages).

"3rd Generation Partnership Project; Technical Specification Group Core Network and Terminals; Access to the 3GPP Evolved Packet Core (EPC) via Non-3GPP Access Networks; Stage 3 (Release 11 )," 3GPP TS 24.302 V11.0.0, Sep. 2011 (58 pages).

"3rd Generation Partnership Project; Technical Specification Group Core Network and Terminals; Access Network Discovery and Selection Function (ANDSF) Management Object (MO) (Release 11 )," 3GPP TS 24.312 V11.0.0, Sep. 2011 (157 pages).

International Searching Authority, International Search Report and Written Opinion in International Application No. PCT/US12/62170, dated Jan. 24, 2013, 16 pages.

Extended European Search Report issued in European Application No. 12843531.0 on Jun. 1, 2016.

Telecom Italia; "Using IMS SC and Multi Access PDN Connectivity for IP Flow Mobility"; 3GPF TSG SA WG2 Meeting #71 (S2-091764); Budapest, Hungary; Feb. 20, 2009; 3 pages.

Research in Motion Ltd., UK, et al.; "Study on Optimized Offloading to WLAN in 3GPP RAT Mobility"; 3GPF TSG SA WG2 Meeting #90 (S2-121638); Bratislava, Slovakia; Apr. 16-20, 2012; 5 pages.

\* cited by examiner

Figure 6.2-1: CS Call Request in E-UTRAN, Call in GERAN/UTRAN

Figure 5.5.2.1.2-1: E-UTRAN to UTRAN Iu mode Inter RAT HO, preparation phase

Figure 5.5.2.1.3-1: E-UTRAN to UTRAN Iu mode Inter RAT HO, execution phase

Table 8.2.15.1: EXTEND SERVICE REQUEST message content

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Extended service request message identity | Message type 9.8 | M | V | 1 |
| | Service type | Service type 9.9.3.27 | M | V | 1/2 |
| | NAS key set identifier | NAS key set identifier 9.9.3.21 | M | V | 1/2 |
| | M-TMSI | Mobile Identity 9.9.2.3 | M | LV | 6 |
| B- | CSFB response | CSFB response 9.9.3.5 | C | TV | 1 |
| 57 | EPS bearer context status | EPS bearer context status 9.9.2.1 | O | TLV | 4 |
| D- | Device properties | Device properties 9.9.2.0A | O | TV | 1 |
| 86 | CSFB PS HO preference | CSFB PS HO preference 9.9.x.y | O | TLV | 4 |

FIG. 19

| 8 | 7 | 6 | 5 | 4 | 3 | 2 | 1 | |
|---|---|---|---|---|---|---|---|---|
| CSFB PS HO preferences IEI | | | | | | | | octet 1 |
| Length of CSFB PS HO preferences contents | | | | | | | | octet 2 |
| EBI (7) | EBI (6) | EBI (5) | spare | spare | spare | spare | spare | octet 3 |
| EBI (15) | EBI (14) | EBI (13) | EBI (12) | EBI (11) | EBI (10) | EBI (9) | EBI (8) | octet 4 |

Figure 9.9.x.y.z: CSFB PS HO preference information element

FIG. 20

Table 8.2.15.1: EXTEND SERVICE REQUEST message content

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Extended service request message identity | Message type 9.8 | M | V | 1 |
| | Service type | Service type 9.9.3.27 | M | V | 1/2 |
| | NAS key set identifier | NAS key set identifier 9.9.3.21 | M | V | 1/2 |
| | M-TMSI | Mobile identity 9.9.2.3 | M | LV | 6 |
| B- | CSFB response | CSFB response 9.9.3.5 | C | TV | 1 |
| 57 | EPS bearer context status | EPS bearer context status 9.9.2.1 | O | TLV | 4 |
| D- | Device properties | Device properties 9.9.2.0A | O | TV | 1 |
| 67 | Preserved EPS Bearers | Preserved EPS Bearers 9.9.x.y | O | TLV | 4 |

FIG. 21

| 8 | 7 | 6 | 5 | 4 | 3 | 2 | 1 | |
|---|---|---|---|---|---|---|---|---|
| Preserved EPS bearers IEI | | | | | | | | octet 1 |
| Length of Preserved EPS bearers contents | | | | | | | | octet 2 |
| EBI (7) | EBI (6) | EBI (5) | EBI (4) | EBI (3) | EBI (2) | EBI (1) | EBI (0) | octet 3 |
| EBI (15) | EBI (14) | EBI (13) | EBI (12) | EBI (11) | EBI (10) | EBI (9) | EBI (8) | octet 4 |

Figure 9.9.X.Y.Z: Preserved EPS Bearers indication information element

FIG. 22

| 8 | 7 | 6 | 5 | 4 | 3 | 2 | 1 | |
|---|---|---|---|---|---|---|---|---|
| EBI (7) | EBI (6) | EBI (5) | EBI (4) | EBI (3) | EBI (2) | EBI (1) | EBI (0) | octet 1 |
| EBI (15) | EBI (14) | EBI (13) | EBI (12) | EBI (11) | EBI (10) | EBI (9) | EBI (8) | octet 2 |

Figure A.B.C.D.1: Preserved EPS Bearers indication information element

FIG. 23

| 8 | 7 | 6 | 5 | 4 | 3 | 2 | 1 | |
|---|---|---|---|---|---|---|---|---|
| 1 | | | | | | | | octet 1 |
| Preserved EPS bearers IEI | | | | | | | | octet 2 |
| Length of Preserved EPS bearers contents | | | | | | | | octet 3 |
| EBI (7) | EBI (6) | EBI (5) | EBI (4) | EBI (3) | EBI (2) | EBI (1) | EBI (0) | octet 4 |
| EBI (15) | EBI (14) | EBI (13) | EBI (12) | EBI (11) | EBI (10) | EBI (9) | EBI (8) | octet 5 |
| Next Extension Header Type (note) | | | | | | | | Octet 6 |

NOTE: The value of this field is 0 if no other Extension header follows.

Figure 6.1.6/1: Preserved EPS Bearers indication extension header

FIG. 24

| 8 | 7 | 6 | 5 | 4 | 3 | 2 | 1 | |
|---|---|---|---|---|---|---|---|---|
| CSFB PS HO preferences IEI ||||||||  octet 1 |
| Length of CSFB PS HO preferences contents |||||||| octet 2 |
| EBI (3) || EBI (2) || EBI (1) || EBI (0) || octet 3 |
| EBI (7) || EBI (6) || EBI (5) || EBI (4) || octet 4 |
| EBI (11) || EBI (10) || EBI (9) || EBI (8) || octet 5 |
| EBI (15) || EBI (14) || EBI (13) || EBI (12) || octet 6 |

Figure 9.9.x.y.z: CSFB PS HO preference information element

FIG. 25

| 8 | 7 | 6 | 5 | 4 | 3 | 2 | 1 | |
|---|---|---|---|---|---|---|---|---|
| Preserved EPS bearer IEI |||||||| octet 1 |
| Length of Preserved EPS bearer contents |||||||| octet 2 |
| EBI (3) || EBI (2) || EBI (1) || EBI (0) || octet 3 |
| EBI (7) || EBI (6) || EBI (5) || EBI (4) || octet 4 |
| EBI (11) || EBI (10) || EBI (9) || EBI (8) || octet 5 |
| EBI (15) || EBI (14) || EBI (13) || EBI (12) || octet 6 |

Figure 9.9.X.Y.Z.1: Preserved EPS Bearers indication information element

FIG. 26

METHODS AND APPARATUS TO HANDLE BEARERS DURING CIRCUIT SWITCHED FALLBACK OPERATION

CROSS-REFERENCE TO RELATED APPLICATION

This application is a divisional of and claims priority to U.S. patent application Ser. No. 13/662,123 entitled "Methods and Apparatus to Handle Bearers during Circuit Switched Fallback Operation filed on Oct. 26, 2012," which claims priority to U.S. Provisional Application Ser. No. 61/552,875, entitled "Methods and Apparatus to Handle Bearers during Circuit Switched Fallback Operation," which was filed on Oct. 28, 2011, and is hereby incorporated herein by reference in its entirety.

FIELD OF THE DISCLOSURE

This disclosure relates generally to mobile communications and, more particularly, to methods and apparatus to handle bearers during circuit switched fallback (CSFB) operation.

BACKGROUND

Handover of communication from one network to another is important for facilitating a positive user experience of, for example, a mobile communication device. However, different networks have different capabilities and must be coordinated in a manner unbeknownst to the user of the mobile communication device.

BRIEF DESCRIPTION OF THE DRAWINGS

FIG. 19 is a diagram of example extended service request (ESR) message content pertaining to CSFB.

FIG. 20 pertains to an example CSFB PS HO preference information element.

FIG. 21 is a diagram of example extended service request (ESR) message content pertaining to preserved EPS bearers.

FIG. 22-24 pertain to an example Preserved EPS Bearers formation element.

FIG. 25 is a diagram of an example CSFB PS HO preference information element.

FIG. 26 is a diagram of an example Preserved EPS Bearers information element.

DETAILED DESCRIPTION

Figure 1:
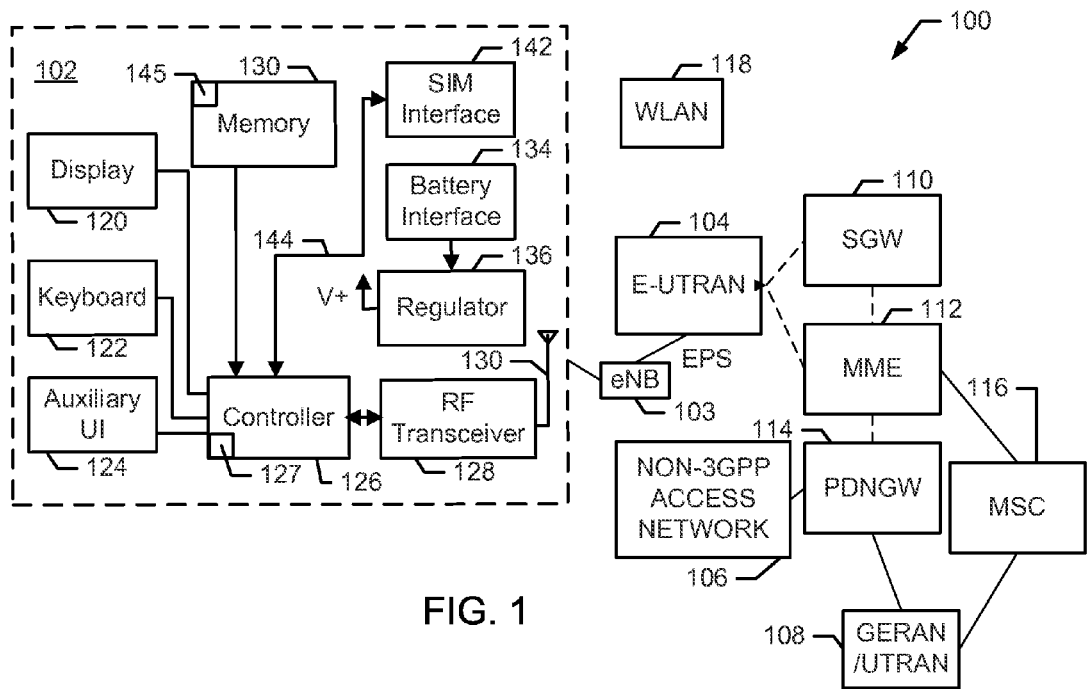
FIG. 1 is a block diagram of an example communication system.

In FIG. 1, a block diagram of an example communication system 100 implemented as described herein handle bearers during circuit switched fallback (CSFB) operation. According to an illustrated example, user equipment (UE) 102 may communicate with one or more wireless communication networks. For example the UE 102 may communicate via an evolved node B (eNB) 103 with a long term evolution (LTE) network 104, one example of which is shown as Evolved Universal Terrestrial Radio Access Network (E-UTRAN). Other access networks such as networks that are not third generation partnership project (non-3GPP access networks) 106, GSM/EDGE Radio Access Networks/UTRAN 108, etc. in the example of FIG. 1, the UE 102 is shown in communication with E-UTRAN 104 and exchanges information therewith using an evolved packet system (EPS) protocol. Non-3GPP access networks 106 may include, but are not limited to, wireless networks such as wireless local area networks (WLANs), etc.

As shown in FIG. 1, E-UTRAN 104 is coupled to a serving gateway (SGW) 110 and a mobility management entity (MME) 112, which is also coupled to the SGW 110. The MME 112 is coupled to a packet data network gateway (PDN-GW) 114, which is also coupled to the non-3GPP access network 106. GERAN/UTRAN 108 is coupled to a mobile switching center (MSC) 116. The system of FIG. 1 also includes a wireless LAN (WLAN) 118.

As shown in one example in FIG. 1, the UE 102 includes a visual display 120, a keyboard 122, and perhaps one or more auxiliary user interfaces (UI) 124, each of which are coupled to a controller 126. The controller 126 is also coupled to a radio frequency (RF) transceiver circuitry 128, which is further coupled to an antenna 130. In one example, the controller 126 is implemented using a central processing unit (CPU) that runs operating system software stored in a memory 130. The controller 126 will normally control overall operation of UE 102, whereas signal processing operations associated with communication functions are typically performed by the RE transceiver circuitry 128. The controller 126 interfaces with the display 120 to present received information, stored information, user inputs, and the like.

The example controller 126 includes a bearer handler 127 that manages UE 102 connectivity when transitioning to and from CSFB. For example, in addition to other functionality, the bearer handler 127 may facilitate bearer preservation from handover to a cellular radio access technology (RAT) during CSFB, or at other suitable operating times. Example methods and apparatus to implement the bearer handler 127 are described below in conjunction with the figures.

The keyboard 122, which may be a telephone type keypad or full alphanumeric keyboard, is normally provided for entering data for storage in the UE 102, information for transmission to the network, such as the E-UTRAN 104, the non-3GPP access network 106, etc. Such data may include a telephone number to place a telephone call, commands to be executed on the UE 102, and possibly other or different user inputs.

The UE 102 sends communication signals to, and receives communication signals from the communication network 104 over a wireless link via the antenna 130. The RF transceiver circuitry 128 performs, for example, modulation/demodulation, encoding/decoding, and encryption/decryption. The RF transceiver circuitry 128 is adapted to particular wireless network or networks in which UE 102 may operate.

The UE 102 further includes a battery interface 134 to receive one or more rechargeable batteries (not shown) that provide power to electrical circuitry in UE 102. The battery interface 134 provides for a mechanical and electrical connection for the battery. The battery interface 134 is coupled to a regulator 136 that regulates power V+ to the device. When the UE 102 is operational, an RF transmitter of the RF transceiver circuitry 128 is typically keyed or turned on only when it is sending information to the network, and is otherwise turned off to conserve resources. Similarly, an RF receiver of the RF transceiver circuitry 128 is typically periodically turned off to conserve power until it is needed to receive signals or information (if at all) during designated time periods.

The UE 102 operates using a Subscriber Identity Module (SIM) (not shown) that is connected to or inserted in the UE 102 at a SIM interface 142. Without the SIM, the UE 102 may be referred to as mobile equipment (ME). The SIM is one type of a removable memory module or smart card used to identify an end user of UE 102 (or subscriber) and to personalize the device, among other things. Without the SIM, the example UE 102 is not fully operational for communication. By inserting the SIM into the UE 102, an end user can have access to any and all of his/her subscribed services.

The SIM generally includes a processor and memory for storing information. Because the SIM is coupled to the SIM interface 142, it is coupled to the controller 126 through communication lines 144. To identify the subscriber, the SIM contains some user parameters such as an International Mobile Subscriber Identity (IMSI). An advantage of using the SIM is that end users are not necessarily bound by any single physical mobile station because the SIM may be used in any number of different mobile stations. The SIM may store additional user information for the UE 102 as well, including datebook (or calendar) information, recent call information, and network connection information.

The UE 102 may be a single unit, such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem. Alternatively, the UE 102 may be a multiple-module unit comprising a plurality of separate components, including but in no way limited to a computer or other device connected to a wireless modem. In particular, for example, in the mobile station block diagram of FIG. 1, the RF transceiver circuitry 128 and antenna 130 may be implemented as a radio modem unit that may be inserted into a port on a laptop computer. In this case, the laptop computer would include the display 120, keyboard 122, one or more auxiliary UIs 124, and the controller 126 may be the computer's CPU. A computer or other equipment not normally capable of wireless communication may be adapted to connect to and effectively assume control of the RF transceiver circuitry 128 and the antenna 130 of a single-unit device such as one of those described above.

The CSFB in EPS enables the provisioning of voice and other CS-domain services by reuse of CS infrastructure when the UE 102 is served by E-UTRAN 104. The CSFB-enabled UE 102 connected to E-UTRAN 104 may use GERAN/UTRAN 108 to connect to the CS-domain. This function is available in case E-UTRAN 104 coverage is overlapped by GERAN/UTRAN 108 coverage. CSFB and Internet Protocol multimedia subsystem (IMS)-based service can co-exist in the same operator's network. However, as the main purpose of CSFB is to provide CS service, such as voice, while the UE 102 is served by E-UTRAN 104 for PS services, such as data services, it is more likely that the CSFB is deployed by operators that have yet to deploy IMS.

Figure 2:
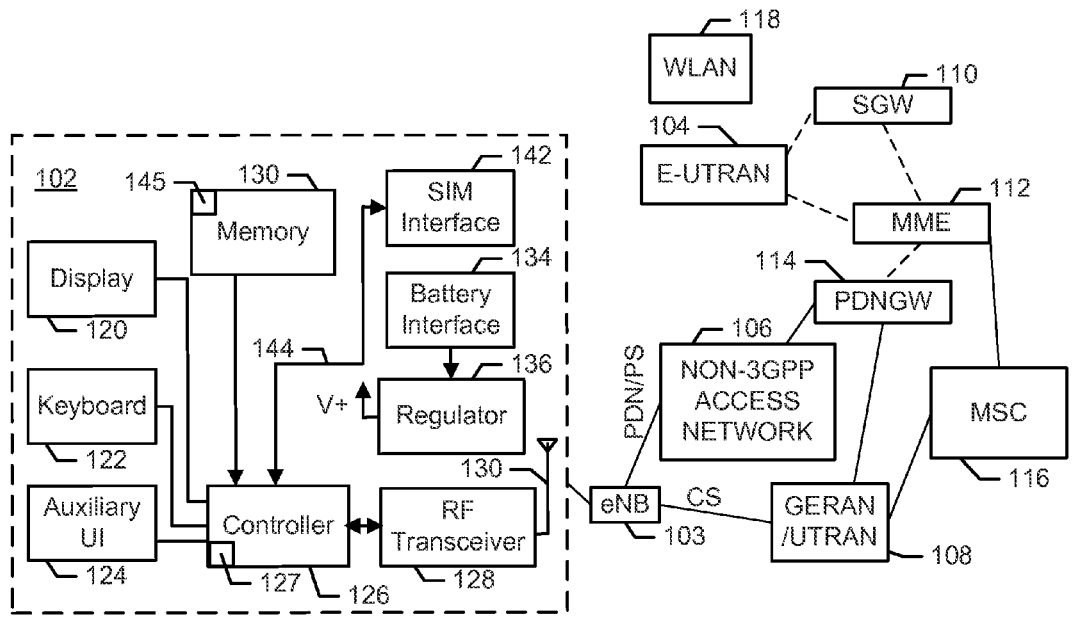
FIG. 2 is a block diagram of the example communication system of FIG. 1 after a circuit-switched fallback (CSFB) operation has been carried out.

FIG. 2 shows one result of a CSFB procedure. Whereas FIG. 1 showed that EPS services were provided to the UE 102 via the E-UTRAN 104, FIG. 2 shows that the UE 102 is connected to the non-3GPP access network for PS services and is connected to GERAN/UTRAN 108 for CS services that are provided through the MSC 116. CSFB is realized in EPS by using the SGs interface mechanism between the MSC 116 and the MME 112. The SGs interface mechanism between the MSC 116 and the MME 112 is an extension of the Gs interface between an SGSN and the MSC. To facilitate CSFB, the UE 102 attaches to the EPS (e.g., attaches to the E-UTRAN 104) using a combined EPS/IMSI Attach Procedure or combined Tracking Area Update Procedure specified in 3GPP TS 23.401, which is incorporated herein by reference. During CSFB (triggered either by a Mobile Originating (MO) Call or a Mobile Terminating (MT) Call), the UE 102 moves to a new cell in GERAN/UTRAN 108 by inter-radio access technology (RAT) PS hand over (HO) procedures if this is supported by the target network, or otherwise by a radio resource control (RRC) connection release with redirection to GERAN/UTRAN 108 or Network Assisted Cell Change (NACC). The CSFB procedure is specified in the 3GPP TS 23.272, which is incorporated herein by reference.

The wireless link shown in communication system 100 of FIG. 1 represents one or more different channels, typically different radio frequency (RF) channels, and associated protocols used between the wireless network 104 and the UE 102. An RF channel is a limited resource that must be conserved, typically due to limits in overall bandwidth and a limited battery power of the UE 102. A wireless network may include hundreds of cells, each served by a base transceiver station (i.e. or station sector), depending upon desired overall expanse of network coverage. All pertinent components may be connected by multiple switches and routers (not shown), controlled by multiple network controllers.

A wireless network may be connected to other systems, possibly including other networks, not explicitly shown in FIG. 1. A network may transmit some sort of paging and system information on an ongoing basis, even if there is no actual packet data exchanged. Although the network consists of many parts, these parts all work together to result in certain behaviors at the wireless link.

Block diagrams of apparatus, communication flows, and flowcharts representative of example processes that may be executed to implement some or all of the elements of the system 100 and mobile communication devices described herein are described below and shown in the drawings.

In these examples, the processes represented by each communication flow or flowchart may be implemented by one or more programs comprising machine readable instructions for execution by: (a) a processor, such as the microprocessor 2912 shown in the example computer system 2900 discussed below in connection with FIG. 29, (b) a controller, such as the controller 126 of FIG. 1, and/or (c) any other suitable device. The one or more programs may be embodied in software stored on a tangible medium such as, for example, a flash memory, a CD-ROM, a floppy disk, a hard drive, a DVD, or a memory associated with the processor 2912, but the entire program or programs and/or portions thereof could alternatively be executed by a device other than the microprocessor 2912 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts may be implemented manually.

Further, although the example processes are described with reference to flowcharts, many other techniques for implementing the example methods and apparatus described herein may alternatively be used. For example, with reference to the flowcharts, the order of execution of the blocks may be changed, and/or some of the blocks described may be changed, eliminated, combined, and/or subdivided into multiple blocks. Any of the described blocks may be as implemented as part of an existing system. For example, blocks may be implemented as part of a mobility manager such as a mobility management entity of an LTE system or may be implemented as a part of a mobile station, etc. While the example block diagrams are described as implementing the processes of the flowcharts, the apparatus of the block diagrams may implement any process and, likewise, the processes of the flowcharts may be implemented by any apparatus, device, system, software, or combination thereof.

Determining, as used herein, may be any type of process for identifying a particular result and is not limited to a computational or analysis process. For example, determining may involve reading an indicator, flag, register, variable, identifier, etc. to determine whether a service is supported. In another example, determining may involve querying, extracting, computing, calculating, etc. to determine a result.

Overcoming the Issue of Dropped Packet Switched Bearers

During the PS HO one or more of the EPS bearers could be dropped if the target system to which the bearers are being handed over cannot accommodate all the EPS bearers. The inability to accommodate EPS bearers may be due, for example, to lack of resources, or the network (e.g., the MME or the target SGSN or RAN) decides that one or more bearers cannot or shall not be handed over.

Any traffic/packets related to the bearers that are not handed over is dropped and the related service/applications cannot exchange traffic anymore and will fail due to loss of network connectivity. Permanent or significant impaired delivery of packets is considered service/application failure or degradation.

The UE 102 is unaware of the real-time traffic conditions of the network and the decisions that the network may make during the handover in terms of dropping bearers. However, if the UE 102 has connectivity to another access network (e.g., WLAN), it would be beneficial if the UE 102 could route the IP traffic corresponding to such bearers over such access network in order to avoid potential dropped bearers or degradation in quality of service (QoS).

Overcoming the Issue of Undesired Handover of Packet Switched Bearers

Due to potential or expected limited network bandwidth (i.e., the bandwidth available in GERAN/UTRAN after the PS HO which the UE 102 is not aware of before the PS HO—may not be preferable. For example, the maximum possible bandwidth of the target network is not sufficient for the service requirements, independently of the real time bandwidth situation when the CSFB is performed. Additionally, a roaming agreement (e.g. in case of inter-PLMN PS HO during the CSFB procedure, the target network may not provide the same QoS available in the source network), cost schemes (e.g. in case of inter-PLMN PS HO during the CSFB procedure, the target network may charge a higher rate per volume than the source network), user subscription or network policies, or any other reasons, the support of specific EPS bearers might not be preferable over UTRAN/GERAN, e.g. for bandwidth consuming data applications such as video streaming. The UE 102 may not be aware of some of these conditions (typically the UE 102 is not aware of those conditions related to real-time conditions of the target system, (e.g., what the radio load is and therefore what QoS the UE 102 can be assigned). Therefore, the PS HO to GERAN/UTRAN of all PS bearers may not be preferred by the user or the operator, especially if non-3GPP (e.g. WLAN) coverage is available. However, when CSFB is performed, currently the PS HO takes place for all the bearers that the network (MME 112 and eNB) decides to hand over to the target RAT.

It is advantageous to avoid that immediately after the PS HO (during which the user may experience a degradation in service, such as in case of video streaming where the streaming client adapts the video quality to the lower bandwidth) the UE 102 hands over the IP traffic corresponding to some bearers to non-3GPP access because such non-3GPP access is preferable to the 3GPP RAT.

Overcoming the Issue of Differentiating RAT Preferences

There may be situations in which it is preferable for the UE 102 (as determined by policies in the UE) to handover one or more IP flows from E-UTRAN to WLAN when the target of the PS HO performed during the CSFB is GERAN, but instead it is preferable to allow the PS HO for such IP flows if the target RAT is UTRAN. In such scenarios, two issues need to be solved:

Ensure that policies can be defined and provided to the UE 102 that can indicate which specific 3GPP RAT is preferable to WLAN and Ensure that the device and/or the network can decide which IP flows need to be handed over to WLAN instead of being handed over to the target cellular RAT (i.e. GERAN or UTRAN) and indicate such preference to the network in order to perform the PS HO for such flows to the target cellular RAT or perform the handover of such IP flows to WLAN.

Solutions to the Foregoing Issues

To address the foregoing issues and other issues, the following describes "bearer preservation from handover to cellular RAT" and "preserved from handover to cellular RAT bearers" in order to refer to PS bearers active over E-UTRAN and that are neither handed over to GERAN/UTRAN with PS HO during CSFB nor dropped during the handover (i.e., bearers that the MME 112 excludes from the set of bearers that are handed over to the target system and that the MME 112 preserves). As described herein, whether the support of some EPS bearers is or is not preferable over a specific access (e.g. UTRAN/GERAN with respect to non-3GPP access such as WLAN) can be defined in a policy table in the UE 102 containing static conditions (i.e., conditions that are not based on the real-time radio coverage available at the time an handover decision needs to be made). The content of the table can be set by the user or the network (e.g., using ANDSF mechanisms). As described herein, when the UE 102 is aware that WLAN is available and that for some IP traffic WLAN is preferable to GERAN/UTRAN (e.g. based on policies in the policy table), it would be advantageous for the UE 102 to be able to indicate to the network that it is preferable to not hand over to GERAN/UTRAN specific bearers.

The following solutions include release compatibility to enable the UE 102 to verify whether the network supports the bearer preservation. In one example, this includes also an indication to the UE 102 of the EPS bearers that the MME 112 allows the UE 102 to transfer to the non-3GPP access. Additionally, the following solutions include a mechanism for indicating to the upper layers in the UE 102 that CSFB needs to be triggered.

Further, the following solutions address how the UE 102 indicates to the network which EPS bearers should be preserved from handover to cellular RAT at different points (e.g., at CSFB triggering, at ESM signaling on a per PDN/bearer basis, etc.).

The following also describes the MME 112 behavior on the network side in order to preserve the bearers during the PS HO at CSFB. Including MME 112 indication to SGW, and the information passed to the PGW at ESM signaling.

Release Compatibility and Feature Discovery

Release compatibility is used to address scenarios in which the UE 102 supports a feature, such as bearer preservation, but the network (e.g., the MME) may not. This may occur, for example, when MME 112 is of a previous release. In such case, the UE 102 may expect the network to behave in a certain way based on the information the UE 102 may have provided (i.e., not handover certain PS bearers to GERAN/UTRAN), but the network may instead behave differently (i.e., ignore possible indications from the UE). Release compatibility ensures deterministic behavior between the UE 102 and the network (e.g., the MME).

Figure 3:
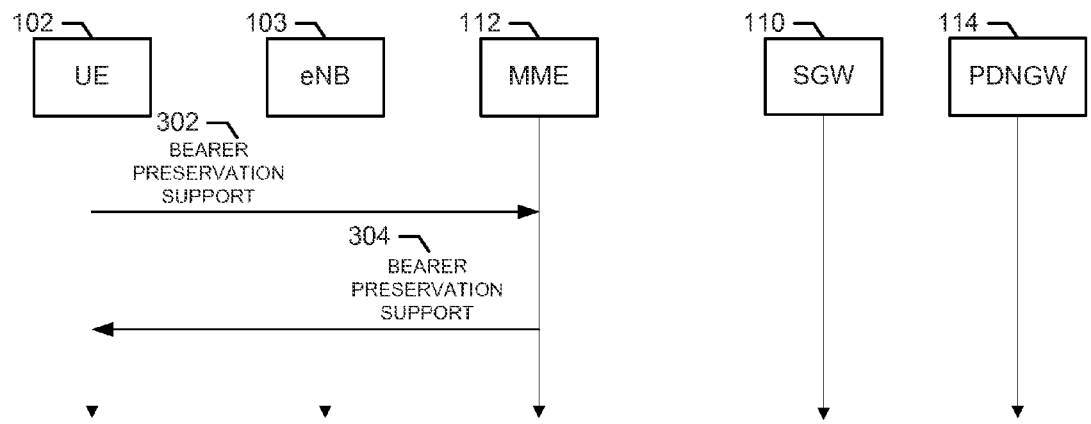
FIG. 3 is a diagram showing an example process of determining bearer preservations support.

In one example, as shown in FIG. 3, release compatibility may be achieved through a capability exchange in which the UE 102 and the MME 112 indicate the respective ability to support bearer preservation. The UE 102 indicates to the MME 112 the ability to support bearer preservation 302 for handover to non-3GPP during CSFB in EMM messages (e.g., Attach Request, Tracking Area Update Request, etc.) and possibly in ESM messages (including PDN connectivity request, Modify EPS bearer context request, Activate dedicated EPS bearer context accept). The capability can be exchanged in EMM messages such as the Tracking Area Update Request and response, because a TAU procedure may require an MME relocation, and the target MME 112 may not support the feature. Upon receiving the capability indication 302 from the UE 102 in one of the messages indicated above, an MME 112 capable of supporting bearer preservation for handover to non-3GPP during CSFB provides an indication of such capability in the response messages 304.

Figure 4:
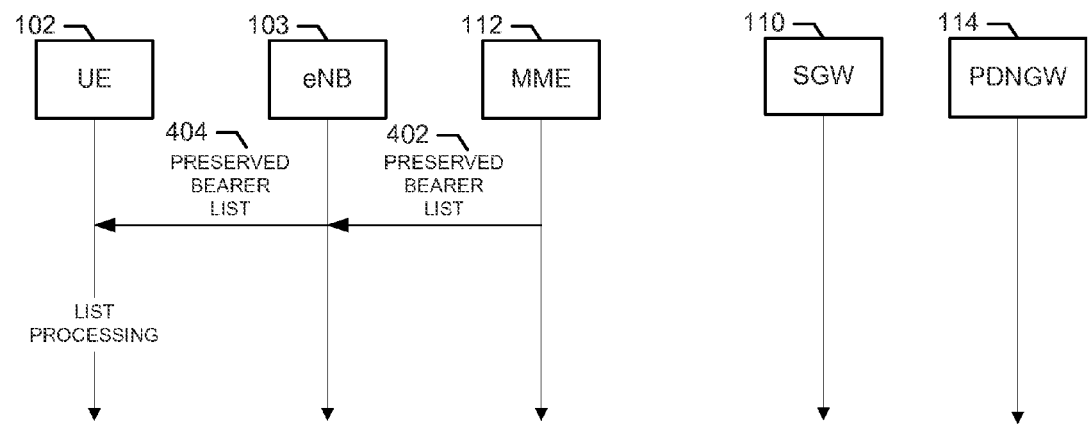
FIG. 4 is a diagram showing a second example process of determining bearer preservations support.

In another example, shown in FIG. 4, the network (e.g., the MME 112) may provide an explicit notification to the UE 102 in the form of a preserved bearer list 402, 404. In one example, during the PS HO part of the CSFB procedure, the MME 112 provides to the UE 102 an indication of the subset of bearers that will not be handed over as part of PS HO to a target RAT during the CSFB procedure. For example, the MME 112 may provide the indication (here referred to as preserved bearers list 402) to the eNB 103 during the execution phase of the PS HO in the Handover Command, and the eNB 103 may provide the indication 404 to the UE 102 in the Handover Command.

In a first approach, the MME 112 provides the indication 402 to the eNB 103 in a parameter in an S1AP message, and upon receipt of such parameter, the eNB 103 creates another parameter including the indication 404 that it passes to the UE 102 in AS signaling (e.g. the Handover Command). In a second approach, the MME 112 creates a parameter containing the indication 402, 404 and such parameter is passed transparently to the eNB 103 between the MME 112 to the UE 102, transporting it in a transparent container between the eNB 103 and the UE 102.

According to the examples of FIG. 4, the UE 102 receives the preserved bearer list 404 and determines which bearers are not being handed over to the target RAT and that have been preserved from handover to cellular RAT by the MME. The receipt of the preserved bearer list 404 provides the UE 102 with an explicit indication of the fact that the MME 112 supports the preserved bearer list. Accordingly, a separate indication as shown in FIG. 3 is not necessary to indicate bearer preservation support. In a further example, if the subset of bearers in the preserved bearer list 404 is empty, the presence of the preserved bearer list 404 serves as indication by the MME 112 to the eNB 103 and by the eNB 103 to the UE 102 that the MME 112 supports the feature of the preserved bearer list but that no bearers can be handed over to non-3GPP access (e.g., based on policy decisions in the MME). In such a case, if no information element (IE), such as an empty preserved bearer list 404, is received by the UE 102, the UE 102 knows that the MME 112 does not support the preserved bearer list. The UE 102 may store the information that the MME 112 does not support the feature of the preserved bearer list to avoid including the indication of which bearers should be preserved from handover to cellular RAT in future ESR messages. This approach may be used in addition to the technique described in conjunction with FIG. 3 for release compatibility and other embodiments to enable the UE 102 to know exactly which bearers it can handover to the non-3GPP access.

Bearer Indication from UE at CSFB Triggering and UE Triggered Handover to Non-3GPP There are two interactions that take place according to this solution: (1) an interaction between the UE 102 and MME 112 and (2) an interaction between the MME 112 and the core network. Each of these interactions is addressed below.

Figure 5:
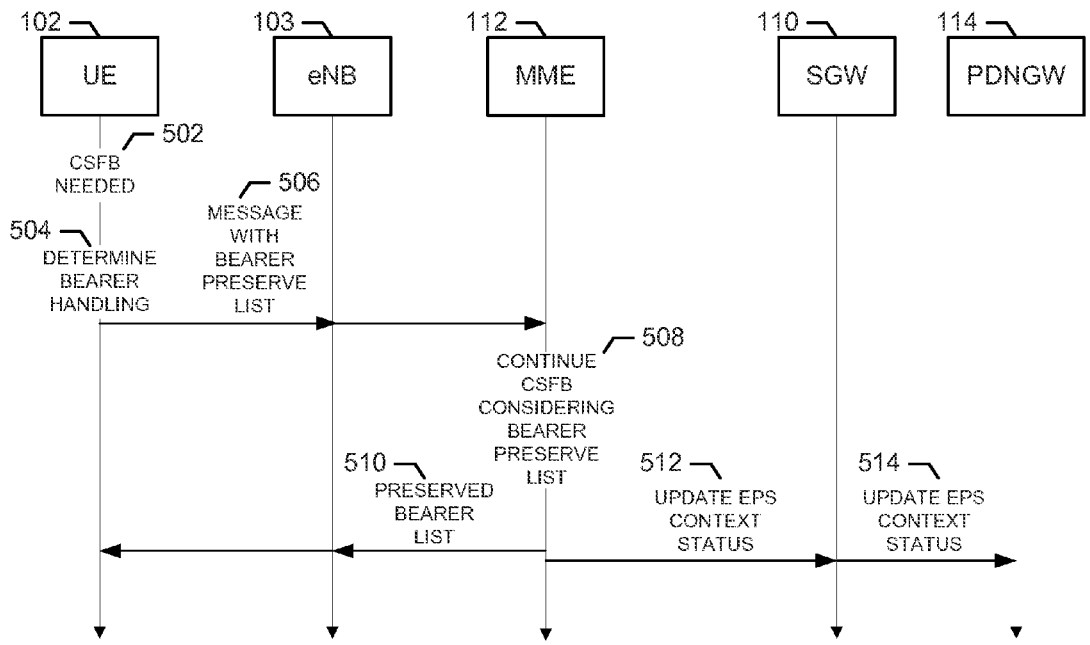
FIG. 5 is a diagram of a UE/MME interaction for providing an explicit bearer indication from UE at CSFB triggering.

In one example shown in FIG. 5, the UE 102 interaction with the MME 112 occurs when the UE 102 determines that CSFB is needed 502. As will be readily understood, CSFB may be needed when the UE 102 receives a paging for a CS mobile terminated service (e.g. a MT voice call) or when the UE 102 determines that a mobile originated CS service is required. The UE 102 subsequently determines bearer handling 504. For example, the UE 102 may determine which bearers should/should not be handed over to GERAN/ UTRAN. The UE 102 may determine which bearers should/ should not be preserved from handover to cellular RAT taking into account a transport selection engine (e.g. ANDSF policies in the UE) and taking into account what applications/IP flows are running over those bearers.

The UE 102 sends a message to the MME, wherein the message includes a bearer preserve list 506 indicating which bearers should or should not be handed over to a cellular RAT. In one example, the UE, when requesting CSFB to the MME, sends along with the request indications of which bearers should/should not be preserved from handover to cellular RAT. The message may be a request to the network or any other suitable message. In one example, the UE provides an indication, for instance an IE named "Preserved EPS Bearers," indicating which bearers should/should not be preserved from handover to cellular RAT.

In one example, the indication is a new information element (IE) that the device includes in the ESR request (e.g. as defined in the appendix) or any appropriate present or future NAS signaling message. In other examples, the IE is a modification of an existing IE. In yet other examples, the indication is a modification of the EPS Bearer Context status information (though the adoption of modifications of an existing IE may create backward compatibility issues). If the UE 102 wishes to preserve all the bearers corresponding to a PDN connection, it may provide a list of all the bearers of that PDN connection or it may provide only the bearer identity of the default bearer for that PDN connection.

In another example, the UE 102 provides a "CSFB PS HO preference" indication (or "HO target network bearer preference" indication) indicating the preference for the handover of EPS bearers, specifically whether the preference is to hand them over to a non-3GPP access or a 3GPP access.

The MME, or other network entities, continue with a CSFB procedure 508 considering the bearer preserve list provided by the UE. For example, the MME 112 process the ESR request and determines, based on the information the UE 102 provides in the indication in the ESR, which EPS bearers should be handed over to GERAN/UTRAN with a PS HO and which bearer shall be preserved from handover to cellular RAT. In an alternative example, if the MME 112 receives from the UE 102 an indication, for instance the Preserved EPS Bearers indication, containing the identity corresponding to the default bearer of a PDN connection, the MME 112 shall preserve all the bearers corresponding to such PDN connection.

During the PS HO preparation phase, the eNB 103 then triggers the PS HO by sending the HO Required message to the MME. The MME 112 includes (in the Forward Relocation Request message) towards the target network node (i.e. the target SGSN) the list of all the PDN connections that the MME 112 decides need to be handed over to the target system, and a list of the EPS bearer contexts that the MME 112 decides to hand over to the target system, excluding the PDN connections and EPS bearer contexts that the MME 112 decides to preserve.

During the PS HO execution phase, the MME 112 provides in the Handover Command to the eNB 103 the Preserved Bearers List 510 containing the list of bearers that have not been handed over to the target system and have not been dropped. If all the EPS bearers have been either handed over to GERAN/UTRAN or have been dropped during the handover preparation phase, the MME 112 provides to the eNB 103 an empty Preserved Bearers List to indicate to the UE 102 that either all the bearers have been handed over to the target system or that all the bearers that cannot be established in the target system have been dropped. In some examples, an empty preserved bearer list may be provided as an indication that the MME 112 supports preserved bearer list functionality.

In one example, the serving eNB 103 upon receiving from the MME 112 an indication corresponding to the subset of bearers that will not be handed over as part of PS HO to target RAT for CSFB (i.e. the Preserved Bearers List) passes that indication to the UE 102 by providing that indication in the HO COMMAND to the UE 102 once the handover execution phase takes place.

Once the PS HO preparation phase is completed and the HO execution phase is started, the MME 112 preserves the bearers that are not handed over to the target RAT in an active state in the MME, SGW and PDN GW so that the handover of such bearers to non-3GPP triggered by the UE 102 takes place according to current procedures. The operation between the MME 112 and the core network is described below.

The MME 112 maintains the bearers in the SGW and PDN GW active by ensuring that the EPS context status in the SGW and PGW for the bearers the MME 112 is preserving and that have not been handed over to GERAN/ UTRAN is updates and is not deleted 512, 514. Additionally, the MME 112 ensures that IP packets corresponding to the bearers that have not been handed over shall not reach the SGSN, and stop at the SGW or PGW. In one example, it is preferable to stop such packets at the PGW since charging of these packets would then not happen. However, the number of packets delivered while the handover to non-3GPP is executed can be considered very limited. How the MME 112 can keep such bearers and what is the state in MME 112 corresponding to this UE 102 is FFS. However, the state stored in the MME 112 for such EPS bearer contexts is not crucial, because the UE 102 is now in GERAN/UTRAN and only has the bearers that were handed over and, should it come back to E-UTRAN, the context in the MME 112 and the UE 102 would be synched up.

In one example, the MME 112 maintains the status in the SGW of the bearers that have been preserved from handover to cellular RAT by sending an indication to the SGW of which EPS bearers shall not be deleted nor re-routed/ switched to the target SGSN during the CSFB. Upon receiving such indication, the SGW stops forwarding IP packets corresponding to the EPS bearers indicated by the MME 112 (and may stop buffering them) and maintains the EPS bearers, and does not send downlink data notifications to the MME 112 when new packets arrive to the SGW.

In another example, the MME 112 sends a modified SUSPEND message to the SGW and indicates explicitly which EPS bearers need to be suspended or preserved from handover to the target system. The MME 112 indicates that the SGW needs to suspend the EPS bearers of a PDN connection that the UE 102 indicated shall not be handed over to GERAN/UTRAN and shall be preserved from handover to cellular RAT. In one example, the SGW processes the SUSPEND message and the indication without forwarding it to the PGW. In another example, the SGW processes the SUSPEND message and forwards it to the PGW; the SGW and the PGW marks the EPS bearer context indicated in the SUSPEND message as "suspended." Currently, the SUSPEND message is used on a per-PDN connection granularity (i.e., currently the who PDN connection is suspended). As described herein, only some of the EPS bearers corresponding to a PDN connection are suspended.

MME Decision Based on Local Information

Figure 6:
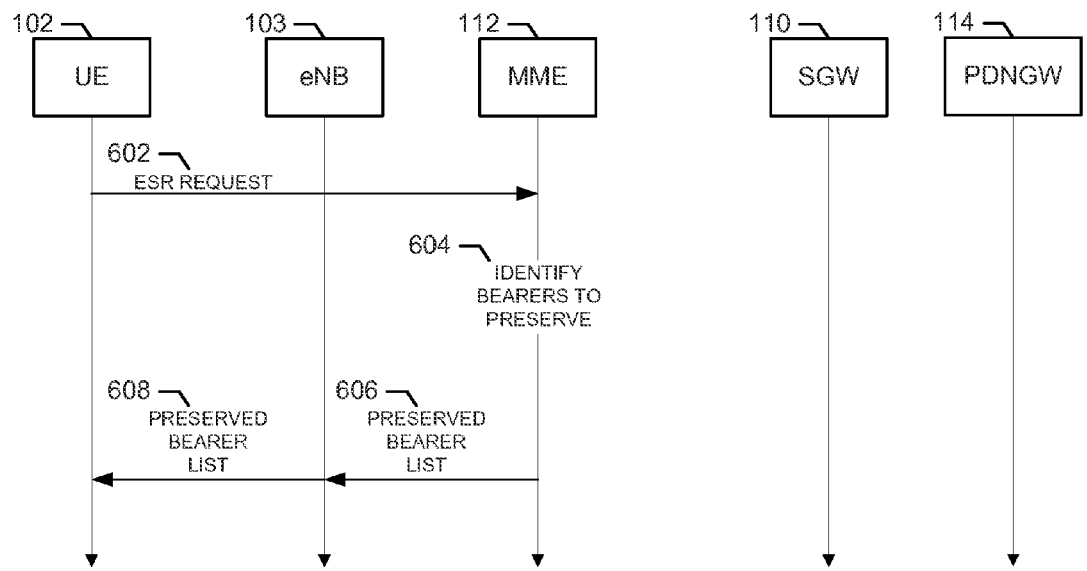
FIG. 6 is a diagram of an MME decision to preserve bearers based on local information.

As shown in FIG. 6, to address the issues of dropped packet switched bearers and undesired handover of packet switched bearers, upon receiving an ESR request 602 from the UE, the MME 112 uses local policies to identify which EPS bearers should be preserved from handover to cellular RAT during the CSFB procedure and the execution of the PS HO 604. Accordingly, the MME 112 also determines which EPS bearers should be handed over to the target system. The MME 112 provides a preserved bearer list 606 to the eNB, as described above in conjunction with FIG. 2. The preserved bearer list 608 may also be provided from the eNB 103 to the UE 102.

In one example, the MME 112 is provided the local policies as part of the user profile that the MME 112 receives from the HSS when the UE 102 attaches to E-UTRAN, or from the SGSN if the UE 102 moves to E-UTRAN from GERAN/UTRAN. In another example, the MME 112 is provided the local policies via operator-specific mechanisms.

Network Triggered Handover to Non-3GPP

Figure 7:
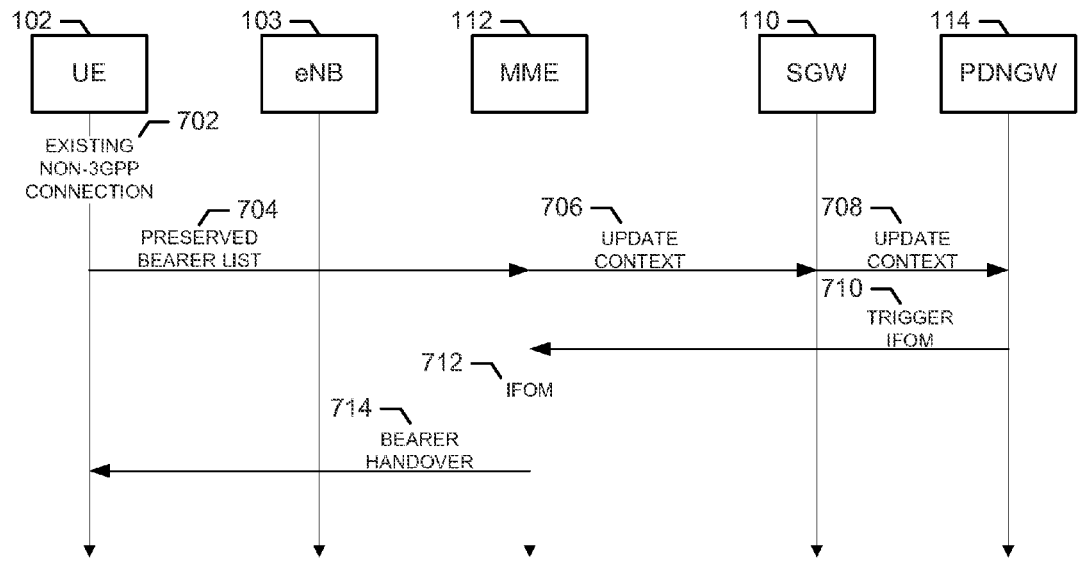
FIG. 7 is a diagram of an example network triggered handover to non-3GPP including a preserved bearer list.

FIG. 7 illustrates an example solution in which the UE 102 is already connected to non-3GPP 702 and has at least one IP flow of at least one PDN connection that is routed/transported over non-3GPP. At the beginning of the CSFB procedure, the UE 102 indicates to the MME 112 that the UE 102 prefers that some or all of the EPS bearers are not handed over to GERAN/UTRAN PS domain and are preserved from handover to the target system if PS HO is supported and used as part of CSFB to GERAN/UTRAN. This indication may take place by the UE 102 sending a preserved bearers list 704 to the MME. Upon receipt of such indication, the MME 112 will maintain the context for these EPS bearers 706, 708 and ensure that they are not deactivated in the core network even if they are not handed over to GERAN/UTRAN as part of the CSFB procedure, by, for example, triggering a bearer suspending procedure including an indication that such EPS bearers are to be transferred to non-3GPP.

In the case the MME 112 determines the UE 102 has LIPA PUN connections, the MME 112 may also preserve from handover to the target system the bearers associated with the LIPA PDN Connections. The UE 102 upon detecting a bearer preserved from handover to the target system, can attempt to reactivate the bearer over another access network than GERAN/UTRAN (we describe below how a UE 102 can detect certain bearers have not been handed over to GERAN/UTRAN). The rest of EPS bearers (unsuspended if any) will be handed over with the PS HO to GERAN/UTRAN access. When the P-GW receives the Suspend message with the additional indication, the P-GW triggers the handover of the EPS bearers to the non-3GPP access (e.g. in case the UE 102 is connected using S2c—i.e. DSMIPv6 with a Home Agent function in the PGW, or using S2b/S2a with PMIPv6 and an LMA function in the PGW).

As shown in FIG. 7, the network (e.g., MME/PGW) sends a trigger 710 to start an IP flow mobility (IFOM) procedure 713 to handover the EPS bearers from E-UTRAN to WLAN based on the indication 704 by the UE 102 that those EPS bearers should be preserved from handover to the target system during the handover to the target system (i.e. GERAN or UTRAN) or not be handed over to GERAN/UTRAN in CSFB. The MME 112 then triggers bearer handover 714.

Currently, the SUSPEND message is used on a per-PDN granularity, i.e. currently the whole PDN connection is suspended. Therefore, with current SUSPEND message and SUSPEND procedure, the use of the SUSPEND message as it is currently defined works only if all the bearers corresponding to a PDN connection are to be moved to WLAN. Alternatively, using the Modified Suspended Message/procedure as described herein only some of the EPS bearers corresponding to a PDN connection are suspended. Therefore, this solution can also be applied to the IP flow mobility case where some of the bearers in PDN connection are to be moved to WLAN.

In one example, the UE 102 is connected to the EPC using S2c, DSMIPv6 with a Home Agent (HA) function in PGW. Upon receiving the Suspend message from the MME 112 with the additional indication that some EPS bearers are preserved from handover to the target system and shall be handed over to non-3GPP, the HA in the PGW initiates the IP flow mobility procedure by sending the MN a Flow Binding Indication (FBI) to handover from E-UTRAN to non-3GPP the flow bindings corresponding to the EPS bearers indicated by the UE.

In another example, the UE 102 is connected to the EPC using S2b/S2a with PMIPv6 and a PMIPv6 LMA function is located in the PGW. When the PGW receives the Suspend message from the MME 112 with the additional indication that some EPS bearers are preserved from handover to the target system and shall be handed over to non-3GPP, the LMA in PGW initiates the IP flow mobility procedure to move the flow bindings (i.e., move IP flows over those indicated EPS bearers from E-UTRAN to WLAN).

Figure 8:
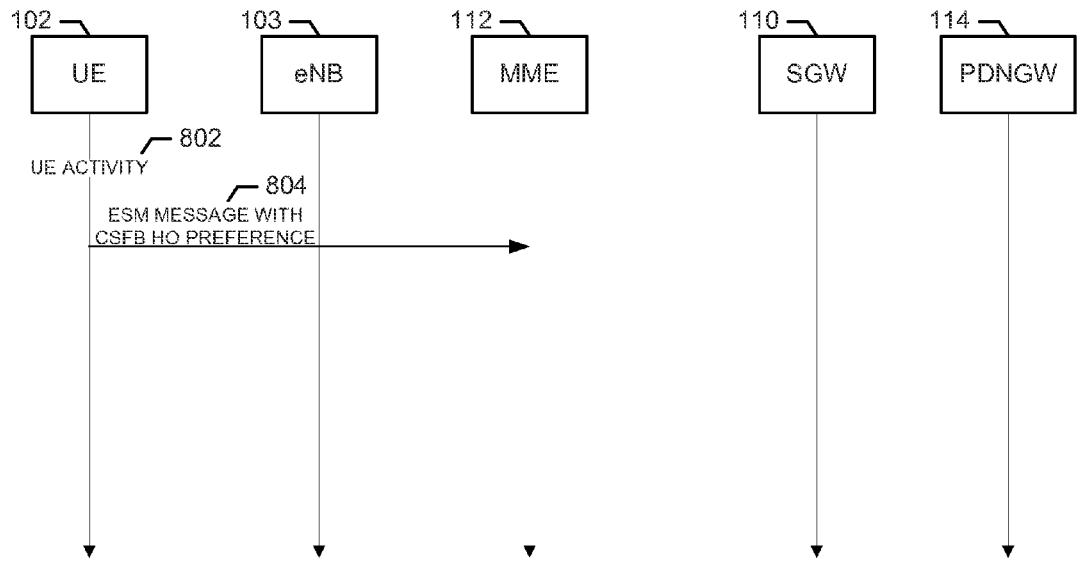
FIG. 8 is a diagram of an example explicit bearer preference indication from UE at bearer creation and mobility procedure.

Explicit Bearer Indication from UE at Bearer Creation and Mobility, UE Triggered Handover to Non-3GPP As shown in FIG. 8, to address the issues of dropped packet switched bearers and undesired handover of packet switched bearers, the UE, which is active 802, provides an indication of which bearers should be preserved from handover to cellular RAT. The indications may be as described above. The indications may be provided to the network using ESM signaling (e.g. when establishing a PDN connection or modifying EPS bearers) instead or in addition to providing it in ESR when triggering CSFB 804.

The UE 102 can provide the previously described indication in number of different scenarios. For example, the UE 102 can provide the indication during a UE 102 Requested PDN connectivity procedure: the UE 102 provides an indication of CSFB HO preference. For example, whether the default EPS bearer (that is automatically created upon PDN connection establishment) and therefore should be handed over to GERAN/UTRAN in case CSFB is to be performed using PS HO. Additionally, the indication can be used to indicate whether the preference applies only to the default bearer or shall apply also to all the dedicated bearers created for the PDN connection (see appendix for an exemplary embodiment).

The indication can also be provided during a UE 102 requested bearer resource allocation procedure: the UE 102 provides an indication of CSFB HO preference when the UE 102 requests the allocation of bearer resources for a traffic flow aggregate (e.g., a dedicated EPS bearer) with a BEARER RESOURCE ALLOCATION REQUEST message. Additionally, the indication can be provided during a UE 102 requested bearer resource modification procedure: the UE 102 provides an indication of CSFB HO preference when the UE 102 requests the modification of bearer resources for a traffic flow aggregate (i.e. a dedicated EPS bearer with a BEARER RESOURCE MODIFICATION REQUEST message.

The UE 102 can update the indication to the network possibly using the ESM STATUS message by including the new indication or using the ESM INFORMATION RESPONSE by extending it so that it can be used not only in response to a request from the network and including the new indication, or a new message to be defined. The UE 102 can include the new indication by including the including the new indication the CSFB PS HO Preference indication or the Preserved EPS Bearers indication described below.

As further addition to these variant solutions, the UE 102 can update the indication to the network upon a series of events, such as change of preferences (e.g., the policy table in the UE 102 is modified), change of WLAN connectivity (if WLAN connectivity is not available).

Upon the UE 102 triggering the CSFB with an ESR message, the MME 112 uses the information provided by the UE 102 in previous ESM signaling (if the UE 102 does not provide additional information in the ESR message as described in the previous embodiments) to decide which bearers should not be handed over to GERAN/UTRAN and should be preserved from handover to cellular RAT, as described above. Upon triggering of CSFB and the PS HO to GERAN/UTRAN, the MME 112 behaves as described above in terms of preserving the bearers towards the SGW and possibly the PGW.

In an alternative example, the UE 102 provides an indication in the ESR message to tell the MME 112 to consider or disregard the CSFB PS HO preferences previously provided in ESM signaling. The UE 102 can, as an example, tell the MME 112 to disregard such previously provided information or tell the MME 112 to not consider such information if the UE 102 determines, upon triggering CSFB, that there is no non-3GPP connectivity or that the non-3GPP connectivity is not preferable.

Alternatively, the same indication that the UE 102 provides in ESM messages 804 can be provided in SM signalling upon creation of the PDP contexts, and transferred to the MME 112 when the UE 102 moves between GERAN/UTRAN and E-UTRAN (both in case of handover and in idle-mode mobility).

Figure 9:
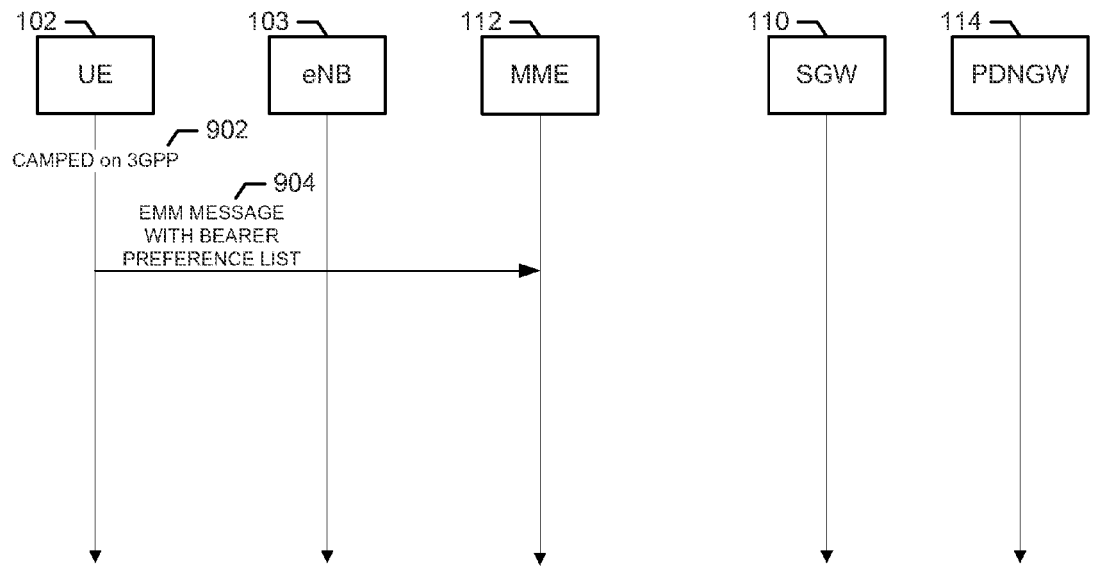
FIG. 9 is a diagram of a second example explicit bearer preference indication from UE at bearer creation and mobility procedure.

An additional example, which may be used in conjunction with the example of FIG. 8, is shown in FIG. 9. When the UE 102 is camping in a 3GPP RAT 902, it may perform idle mode mobility between 3GPP RATs (e.g., from UTRAN to E-UTRAN). If the UE 102 created the PDN Connections while connected to GERAN/UTRAN using SM mechanisms for PDP context establishment (e.g., because WLAN was not available even if the UE 102 determines that WLAN would be preferable). According to the examples described above, the UE 102 did not provide to the network any indication to the SGSN regarding the preference for the bearers treatment upon handover from E-UTRAN to GERAN/UTRAN in case of CSFB. When the UE 102 moves to E-UTRAN from GERAN/UTRAN, the information about which bearers of a PDN connection should not be handed over to 3GPP GERAN/UTRAN and should not be dropped in case of CSFB are not available to the network. Therefore, as shown in FIG. 9, the UE 102 may provide in EMM messages such as Tracking Area Update the indication of which bearers should not be handed over to GERAN/UTRAN in case of CSFB and which bearers should not be dropped 904. Such information can be conveyed in a manner as described above. The UE 102 may provide such information e.g., if upon performing mobility the UE 102 is aware that WLAN connectivity is available.

Figure 10:
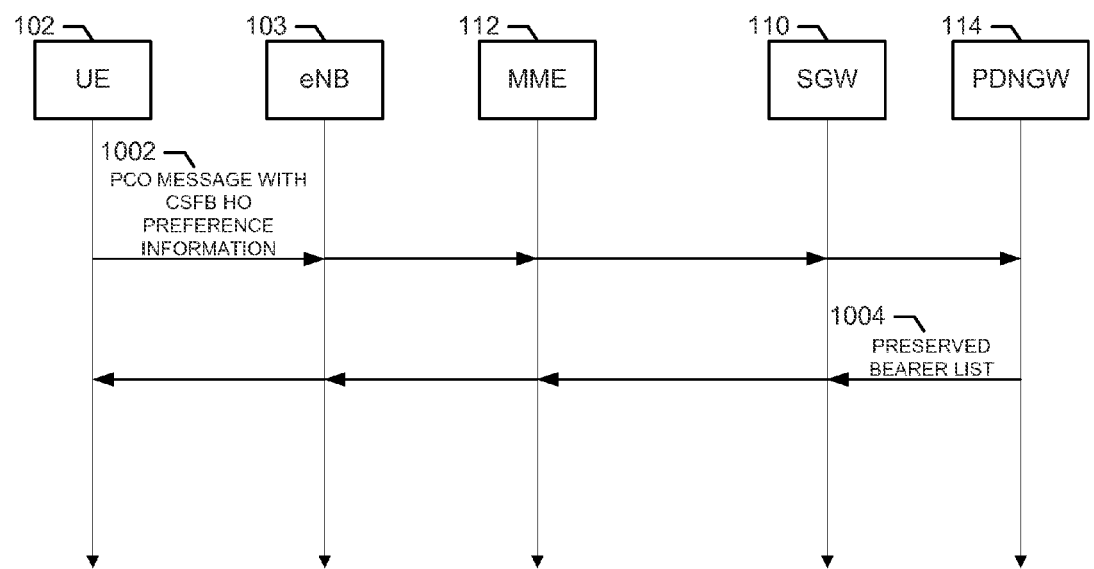
FIG. 10 is a diagram of a third example explicit bearer preference indication from UE at bearer creation and mobility procedure.

An additional example, complementary to the first example described above is shown in FIG. 10. As shown in FIG. 10, the UE 102 can alternatively (or in addition to the indication described above that is provided to the MME 112 in ESM signaling) include an indication (e.g. the CSFB PS HO Preference indication or the Preserved EPS Bearers indication described below) in a PCO 1002 that the UE 102 sends to the network, so that the indication is received by the PGW. The PDN GW may return to the UE 102 an indication 1004 (e.g. using the Preserved EPS Bearers indication described below) to indicate to the UE 102 which EPS bearers may or can be preserved from handover to cellular RAT in case of PS HO to GERAN/UTRAN.

Figure 11:
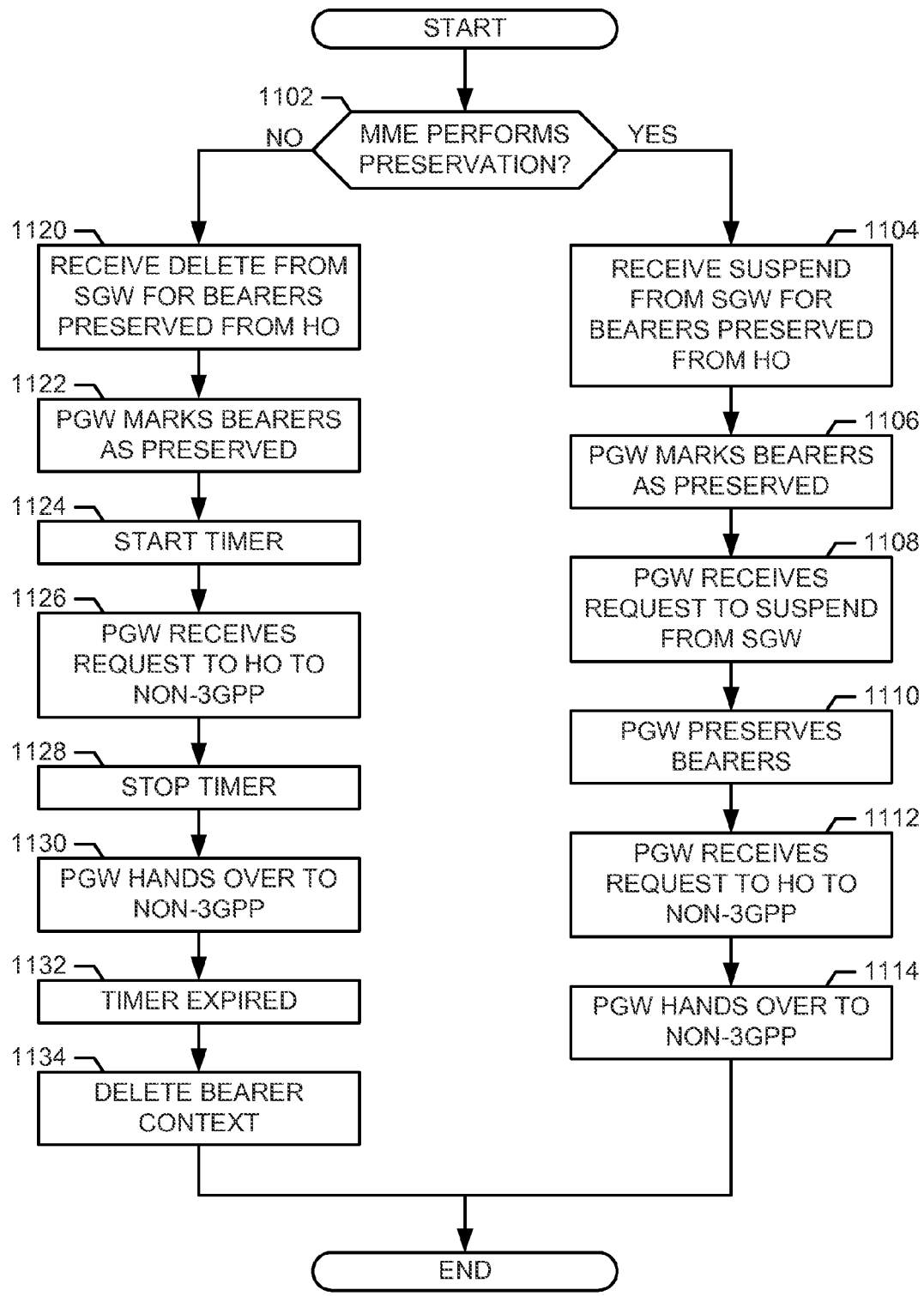
FIG. 11 is a flowchart of a UE behavior based on explicit bearer indication from UE at bearer creation and mobility.

As shown in FIG. 11, during operation, the MME 112 may perform preservation of the bearers (block 1102) towards the SGW (and therefore towards the PDN GW) as indicated above, or may not perform such preservation, in which case the bearers may be deleted in the SGW and PDN GW. If the MME 112 performs preservation (block 1102), upon receiving from the SGW a suspend request for EPS bearers that the UE 102 has indicated to the PGW as bearers that should be preserved from handover to cellular RAT (block 1104), the PGW maintains the EPS bearer context for such bearers and marks them as "preserved from handover to cellular RAT" (block 1106). If the PGW receives from the SGW an indication to suspend the bearers (block 1108), and an explicit indication (as per the embodiment described above) of the EPS bearers of a PDN connection that the UE 102 indicated shall not be handed over to GERAN/UTRAN and shall be preserved (block 1110) from handover to cellular RAT, then upon receiving a request to handover the bearers (block 1112) to the non-3GPP access, the PGW behaves as if the bearers were active and performs the steps defined in current specifications for the handover towards non-3GPP (block 1114).

If the MME 112 does not perform preservation (block 1102), upon receiving from the SGW a request to delete EPS bearers that the UE 102 has indicated to the PGW as bearers that should be preserved from handover to cellular RAT (block 1120), the PGW maintains the EPS bearer context for such bearers and marks them as "preserved from handover to cellular RAT" (block 1122) and starts a timer Preserved_Bearer associated to each preserved bearer from handover to cellular RAT (block 1124). Upon receiving a request to handover the bearers to the non-3GPP access (block 1126), the PGW stops the Preserved_Bearer timer (block 1128) for the bearers that are being handed to the non-3GPP access, and the PGW behaves as if the bearers were active but does not trigger any signalling to the SGW to perform the handover to non-3GPP (as defined in current procedures) (block 1130). If the timer Preserved_Bearer expires (block 1132), the PGW deletes the EPS bearer context for the EPS bearer associated to the timer (block 1134). This is done to handle the scenario where the original request from the SGW to deleted the bearers was an actual PDN disconnection request from the MME.

Triggering of Handover to Non-3GPP and Race Conditions

If some of the solutions described herein are implemented, the following problem may arise. If the UE, upon triggering the CSFB to GERAN/UTRAN for MO or MT CS services, desires to handover some EPS bearers to a non-3GPP access, the UE 102 can either trigger the handover to non-3GPP simultaneously with the triggering of CSFB, or can wait for the CSFB and the related PS HO (if it takes place) to occur. If the UE 102 waits until the PS HO occurs (e.g. when the UE 102 receives the handover command from the eNB), the UE 102 can be aware of which bearers are actually being handed over to the GERAN/UTRAN RAT. The UE 102 may then notice that some of the bearers it wishes to handover to the non-3GPP access are now being handed over to GERAN/UTRAN, in which case the device can trigger the handover of such bearers to the non-3GPP access. However, the problem is the device does not know whether the other bearers have been dropped by the network (e.g. MME or eNB) due to policy decisions or resource conditions, or if the MME 112 has "preserved them from handover to cellular RAT" (i.e. it has decided to not hand these bearers over to GERAN/UTRAN as part of the PS HO during the CSFB procedure) in order for the UE 102 to be able to hand them over to the non-3GPP access. Moreover, the SGSN will actually deactivate such bearers upon completion of the handover thus not allowing the UE 102 to hand them over to non-3GPP.

For example, the UE 102 may trigger the handover of IP flows/PDNs to non-3GPP: as soon as ESR procedure is started (in parallel with performing RAT change for CSFB), though this may cause the failure of the handover to non-3GPP if the bearers are being dropped during the PS HO or upon receiving the HO Command with an indication of which bearers have been preserved from handover to cellular RAT and can therefore be handed over to non-3GPP or as soon as PS HO is completed.

Figure 12:
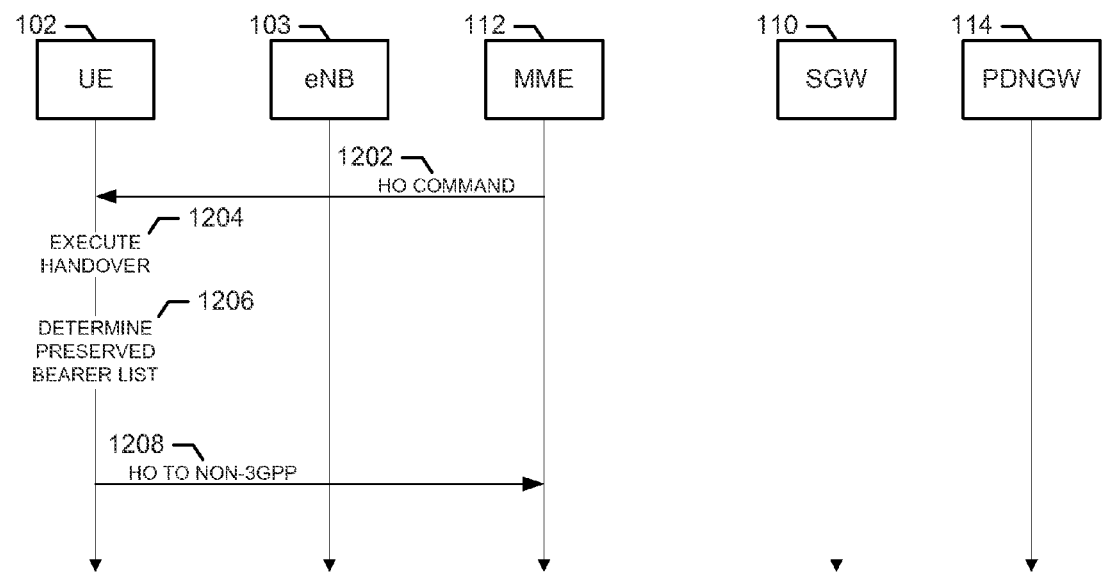
FIG. 12 is a diagram of an example triggering of handover to non-3GPP.

In one example, which is shown in FIG. 12, after receiving the HO command 1202 and executing the handover 1204, the UE 102 determines a preserved bearer list 1206. In one example, the UE 102 detects which RABs have been allocated in the target RAT (GERAN or UTRAN) and therefore knows which bearers have been handed over (possibly including some that the UE 102 wanted to preserve) and which bearers have not been handed over (including those that the UE 102 want to preserve but that may have been dropped by the MME). The UE 102 then triggers the HO to non-3GPP 1208 of the bearers that have been preserved from handover to cellular RAT. In such a case, the handover to non-3GPP of some of the bearer may not take place since the MME 112 or the eNB 103 may have deactivated such bearers during the PS HO to GERAN/UTRAN.

Figure 13:
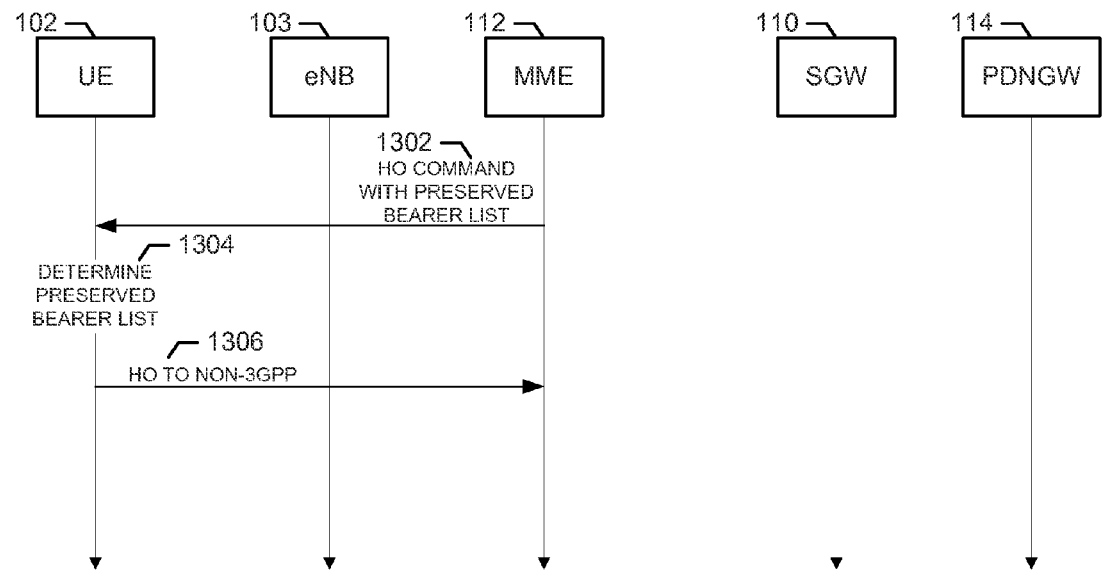
FIG. 13 is a diagram of a second example triggering of handover to non-3GPP based on a preserved bearer list.

In another example shown in FIG. 13, upon receiving an indication from the eNB 103 in the HO command of which bearers been preserved from handover to cellular RAT 1302, the UE 102 determines which bearers have been preserved from handover to cellular RAT 1304. The UE 102 then triggers the handover of the bearers 1306 preserved from handover to cellular RAT to non-3GPP. This handover to non-3GPP happens in parallel to the PS HO of the bearers that have not been preserved from handover to cellular RAT, but race conditions and conflicts between the two procedures have been avoided.

Indication at CSFB

Figure 14:
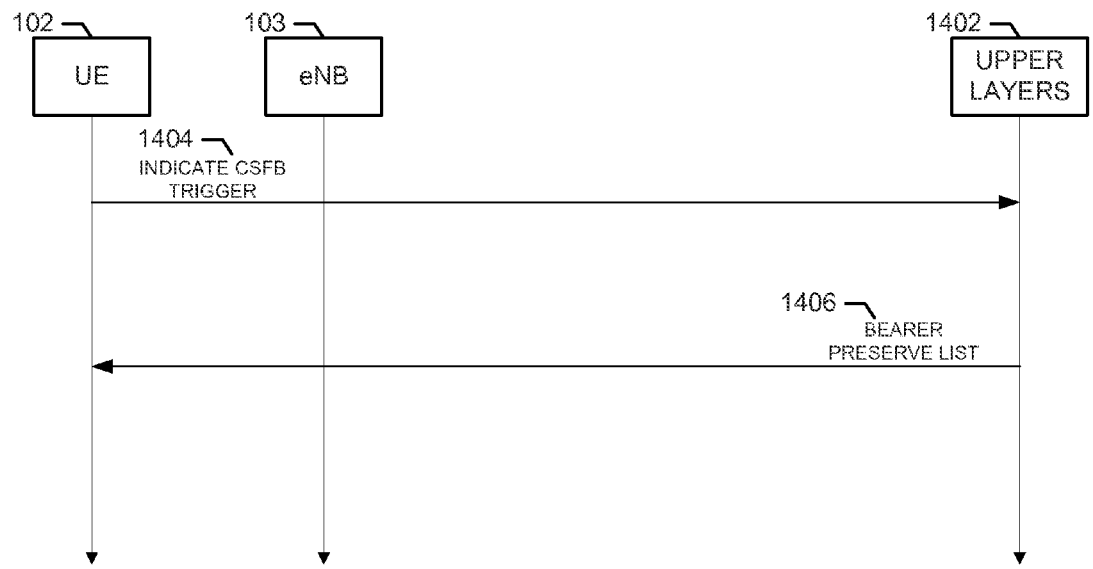
FIG. 14 is a diagram of providing an indication of preserved bearers at CSFB.

As shown in FIG. 14, to address the issues of dropped packet switched bearers and undesired handover of packet switched bearers, upon determining that CSFB needs to be triggered (e.g. upon receiving a paging request containing an indication that an MT CS service is to be established, such as an MT CS call, or upon determining that an MO CS service needs to be established), the UE 102 indicates to upper network layers 1402 that CSFB needs to be triggered 1404 and the UE 102 waits for an indication from the upper layers. The upper layers provide a bearer preserve list 1406 as an indication of which IP flows or EPS bearers should not be handed over to GERAN/UTRAN and should not be dropped by the network.

Indication of Bearer Preference in Case of CSFB Via AT Command

To address the issues of dropped packet switched bearers and undesired handover of packet switched bearers, an AT Command may be used for the upper layers or mobile application to indicate the bearers that should or should not preferably to handed over to GERAN/UTRAN if CSFB is performed via PS HO. This AT Command will allow upper layers or mobile applications to convey the information to NAS so as to be used as described above.

Modification of Indication of which Bearers the UE Wants to Preserve Based on WLAN Availability In reference to the above description, in one example, upon determining that WLAN connectivity is available for the UE 102 and that WLAN is preferable to GERAN/UTRAN for some EPS bearers, the UE 102 provides an indication to the network (as described above) of what bearers should or should not preferably to handed over to GERAN/UTRAN if CSFB is performed via PS HO.

The UE, upon detecting the availability of non-3GPP access as outlined above and upon detecting that the UE 102 has one or more LIPA PDN connections active (and therefore that the LIPA PDN connections are to be deactivated due to the handover to the target system, e.g. an handover from the HeNB to a non-HeNB cell), the UE 102 may indicate to the network that the bearers corresponding to the LIPA PDN connections should be preserved. The UE 102 may do so even if 3GPP access is preferable to non-3GPP access, in order for the UE 102 to maintain the bearers in case of CSFB (since otherwise the bearers would be dropped during the PS HO in the CSFB procedure. In addition, upon detecting during a CSFB procedure that non-3GPP access is available and that one or more LIPA PDN connections are to be deactivated due to the handover to the target system, the network may preserve from handover to the target system the bearers associated with the LIPA PDN connections and indicate to the UE 102 that such bearers are being preserved. When receiving an indication from the network that one or more bearers are being preserved (e.g. upon detecting they haven't been handed over to GERAN/UTRAN), the UE 102 may attempt a HO to non-3GPP of these bearers. The UE 102 may do so even if the UE 102 did not indicate or request that one or more bearers should be preserved. Upon failure to participate in a handover procedure for the preserved bearers, the network may eventually deactivate the preserved bearers.

Differentiating RAT Preferences

Figure 15:
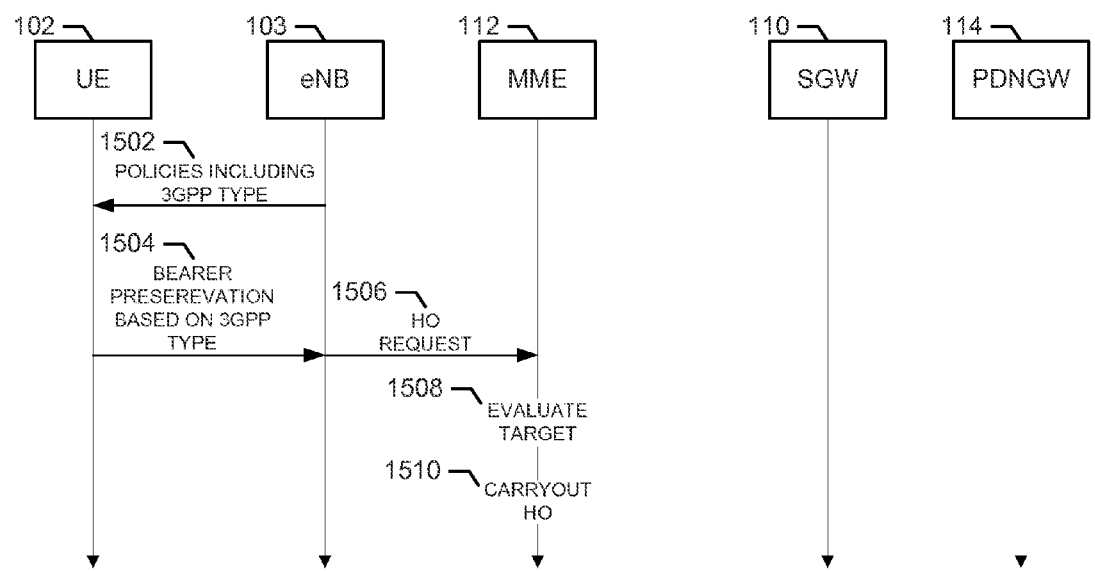
FIG. 15 is a diagram of a system utilizing differentiating RAT preferences.

This solution addresses the issue of differentiating RAT preferences. As shown in FIG. 15, policies 1502 are provided by the network (e.g. using ANDSF ISRP) to the UE 102 and indicating which access is preferable for various IP flows or PDN connections and indicating the specific 3GPP RAT (i.e. GERAN and UTRAN). These policies differ from the current ISRP because the current ISRP only indicates "3GPP" and not the specific 3GPP RAT type. Detailed changes of the policies are described below. In this example, the UE 102 does not use the enhanced ISRP policies to decide which is the target RAT towards which PS HO should be executed. In this example, in addition to the indications described above and regarding which bearers should be preserved from handover to cellular RAT, the UE 102 provides an additional indication indicating whether the bearer should be preserved from handover to cellular RAT based on the 3GPP type 1504. For example, when the target of the handover is GERAN, or when the target is UTRAN, or both. In this embodiment, the network decides which bearers need to be preserved from handover to cellular RAT based on the previous descriptions and this additional indication.

Upon receiving the Handover Required message 1506 from the eNB during the HO preparation phase, the MME 112 determines based on the Target ID parameter whether the target of the PS HO is a GERAN cell or a UTRAN cell 1508. The Target ID in fact contains either the Target RNC-ID (composed of the mandatory LAI, optional RAC, mandatory RNC-ID and optional Extended RNC-ID) in case of handover towards E-UTRAN, or the Cell Global ID (containing the mandatory PLMN identity, LAC and CI, and the optional RAC) in case of handover to a GERAN A/Gb mode. The MME 112 then carries out the HO 1510. In this example, the UE 102 receives the indication from the network a list of which bearers have been preserved from handover to cellular RAT during the handover execution.

Example Modifications to Existing Specifications

The following are example modifications to existing standards that may be implemented to carry out one or more of the foregoing examples. Other examples are possible, as are other potential modifications to existing standards. Accordingly, the following is provided for purposes of example and is not to be considered limiting.

Figure 16:
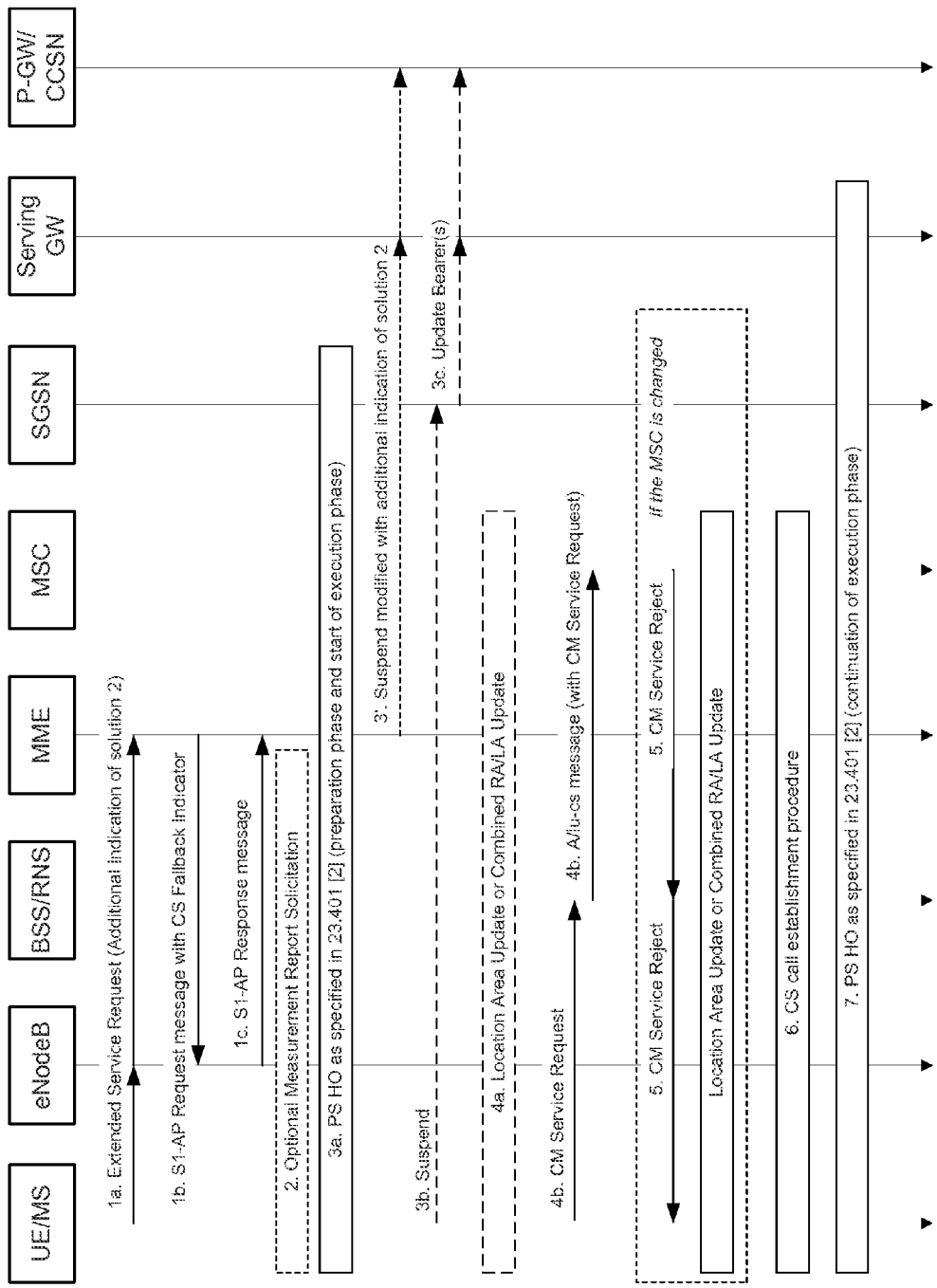
FIG. 16 is diagram of a CS call request process.

The following are example standard changes may be carried out to implement release compatibility and feature discovery, as well as bearer indication from the UE 102 at CSFB triggering and UE 102 triggered handover to non-3GPP, wherein additions to the standard are shown as underlined text and deletions from the standard are shown using strikeout text. The following is to be read in conjunction with FIG. 16, which is a modified version of FIG. 6.2-1 from TS 23.772.

[TS 23.272]2.1.1 Mobile Originating Call in Active Mode—PS HO Supported

This flow may be executed when the eNodeB knows that both the UE and the network support PS HO, in the normal case. Clause 6.6 describes the procedure when the procedure is rejected by the MME.

NOTE 1: DTM is not mandatory for CS Fallback to work and is not linked to PS HO.

1a. The UE sends an Extended Service Request for mobile originating CS fallback to MME. Extended Service Request message is encapsulated in RRC and S1-AP messages. The UE only transmits this request if it is attached to CS domain (with a combined EPS/IMSI Attach) and cannot initiate an IMS voice session (because e.g. the UE is not IMS registered or IMS voice services are not supported by the serving IP-CAN, home PLMN or UE). The UE includes the CSFB PS HO preference IE or the Preserved EPS Bearers IE to indicate the bearers to be maintained by the MME and consequently shall not be handed over to GERAN/UTRAN.

1b. The MME sends an S1-AP UE Context Modification Request (CS Fallback Indicator, LAI) message to eNodeB. This message indicates to the eNodeB that the UE should be moved to UTRAN/GERAN. The registered PLMN for CS domain is identified by the PLMN ID included in the LAI, which is allocated by the MME. If the MME determines the CS Fallback procedure needs priority handling based on MPS CS Priority in the UE's EPS subscription, it also sets priority indication, i.e. "CSFB High Priority", in the S1AP message to the eNodeB as specified in TS 36.413 [35].

1c. The eNodeB shall reply with S1-AP UE Context Modification Response message.

2. The eNodeB may optionally solicit a measurement report from the UE to determine the target GERAN/UTRAN cell to which PS handover will be performed.

NOTE: Based on operator policy, the priority indicator received in step 1b may be used by eNodeB to decide whether to continue CS Fallback procedures with PS HO, i.e. step 3a, or to initiate radio release procedure to redirect the UE to 2G/3G Circuit Switch as specified in clause 6.3.

3a. The eNodeB triggers PS handover to a GERAN/UTRAN neighbour cell by sending a Handover Required message to the MME. The eNodeB selects the target PS handover cell considering the PLMN ID and possibly the LAC for CS domain provided by the MME in step 1b.

If the eNB is a HeNB, the HeNB should perform step 3 through step 6 of clause 6.3 instead of PS HO if the HeNB detects that the UE has only LIPA PDN Connections. CSFB will not be completed successfully when PS HO is performed if the UE has only LIPA PDN Connections as PS HO would result in the MME detaching the UE.

NOTE 2: For details how the HeNodeB determines whether a PDN connection is a LIPA PUN connection see TS 23.401 [2], clause 4.3.16.

In the following, an inter-RAT handover from E-UTRAN to UTRAN or GERAN as specified in TS 23.401 [2] begins. The eNodeB indicates in the Source RNC to Target RNC Transparent container that PS handover was triggered due to CSFB. The eNodeB also indicates whether CSFB was triggered for emergency or priority call handling purpose. If the network supports a priority call handling, the eNodeB may forward the priority indication to the target GERAN/UTRAN in the Source to Target Transparent Container, and the target GERAN/UTRAN allocates radio bearer resources taking received priority indication take into account.

As part of this handover procedure, the MME determines, based on the CSFB PS HO preference IE or the Preserved EPS Bearers IE provided by the UE, that some EPS bearers shall not be handed over to GERAN/UTRAN. Thus during the handover preparation phase the MME provides to the target SGSN the list of PDN connections and the EPS bearer contexts that the MME determines shall be handed over to the target system. During the handover execution phase, the MME provides to the eNB the list of bearers that have been preserved in E-UTRAN system in the Preserved Bearer List. If MME determines that all EPS bearers shall be handed over to GERAN/UTRAN independently of the CSFB PS HO preference IE or the Preserved EPS Bearers IE provided by the UE, the MME provides to the eNB an empty reserved Bearers List. This Preserved Bearers List is then provided to the UE to indicate to the UE that all the bearers identified by the UE in the CSFB PS HO preference IE or the Preserved EPS Bearers IE have been or have not been transferred to GERAN/UTRAN as part of the PS HO. EPS bearers which are not in this Preserved EPS Bearers IE list and not been handed over to target system would be dropped.

As part of this handover, the UE receives a HO from E-UTRAN Command and tries to connect to a cell in the target RAT. The HO from E-UTRAN Command may contain a CS Fallback indicator which indicates to UE that the handover is triggered due to a CS fallback request. If the HO from E-UTRAN Command contains a CS Fallback Indicator and the UE fails to establish connection to the target RAT, then the UE considers that CS fallback has failed. Service Request procedure is considered to be successfully completed when PS Handover procedure is completed successfully.

NOTE 3: During the PS HO the SGSN does not create a Gs association with the MSC/VLR.

NOTE 4: Service Request procedure supervision timer shall be sufficiently long considering the optional measurement reporting at step 2.

When the UE arrives at the target cell, if the target RAT is UTRAN, the UE establishes the radio signalling connection by sending an RRC Initial Direct Transfer message as specified in TS 25.331 [7] that contains a NAS message. The CN Domain Indicator is set to "CS" in the Initial Direct Transfer message.

If the target RAT is GERAN A/Gb mode: The UE establishes a radio signalling connection by using the procedures specified in TS 44.018 [4] (i.e. UE requests and is assigned a dedicated channel where it sends a SABM containing a NAS message to the BSS and the BSS responds by sending a UA). Upon receiving the SABM (containing the NAS message) the BSS sends a COMPLETE LAYER 3 INFORMATION message (containing the NAS message) to the MSC which indicates CS resources have been allocated in the GERAN cell. If both the UE and the target cell support enhanced CS establishment in DTM (indicated by GERAN system information included within the HO from E-UTRAN Command) a RR connection may be established while in packet transfer mode without release of the packet resources, see TS 43.055 [24]. After the establishment of the main signalling link as described in TS 44.018 [4] the UE enters either Dual Transfer Mode or Dedicated Mode.

3'. If the MME provided a non-empty Preserved Bearers List to the eNB in step 3a, the MME starts a Suspend procedure towards the Serving GW corresponding to the EPS Bearers in the Preserved Bearer List and it provides the Preserved Bearer List indicating which EPS bearers are being preserved from handover to the target system. The Serving GW receiving this indication suspends the corresponding EPS bearers and may triggers the Suspend procedure towards each PDN GW corresponding to the EPS Bearers in the Preserved Bearer List. The PDN GW receiving this indication suspends the corresponding EPS bearers.

3b. If the target RAT is GERAN and the UE has entered Dedicated Mode, the UE starts the Suspend procedure (see TS 44.018 [4]) unless both the UE and the Target cell support DTM in which case TBF reestablishment may be performed.

3c. A Gn/Gp-SGSN that receives the Suspend message from the UE follows the Suspend procedure specified in TS 23.060 [3], clause 16.2.1.1.1.

An S4-SGSN that receives the Suspend message from the UE follows the Suspend procedure specified in TS 23.060 [3]. The S4-SGSN deactivates GBR bearers towards S-GW and P-GW(s) by initiating MS- and SGSN Initiated Bearer Deactivation procedure as specified in TS 23.060 [3], and starts the preservation and suspension of non-GBR bearers by sending Suspend Notification message to the S-GW. The S-GW releases all RNC related information (address and TEIDs) for the UE if Direct Tunnel is established, and sends Suspend Notification message to the P-GW(s). The SGSN stores in the UE context that UE is in suspended status. All the preserved non-GBR bearers are marked as suspended status in the S-GW and PGW(s). The P-GW should discard packets if received for the suspended UE.

4a. If the LA of the new cell is different from the one stored in the UE, the UE shall initiate a Location Area Update or a Combined RA/LA Update procedure as follows:

if the network is operating in NMO-I (Network Modes of Operation), the UE may initiate a separate Location Area Update before initiating the RAU procedure instead of a Combined RA/LA Update procedure (to speed up the CSFB procedure); or if the network is operating in NMO-II or NMO-III, the UE shall initiate a Location Area Update before initiating the RAU procedure required for PS handover.

When the UE initiates a Location Area Update the UE shall set the "follow-on request" flag in the LAU Request in order to indicate to the MSC not to release the Iu/A connection after the LAU procedure completion. The UE shall indicate to the target MSC that this is an originating call establishment as a result of CSFB by including the "CSMO" flag. Further the UE performs any Routing Area Update procedure as specified by TS 23.060 [3].

The UE may initiate a Location Area Update procedure immediately when the UE is handed over to the target cell i.e. before the UE receives e.g. LAI or NMO information as part of the RAN Mobility Information.

4b. The UE sends a CM Service Request to the MSC. The UE shall indicate to the MSC that this is an originating call establishment as a result of CSFB by including the "CSMO" flag.

5. If the UE is not registered in the MSC serving the 2G/3G target cell or the UE is not allowed in the LA, the MSC shall reject the CM service request, if implicit location update is not performed. The CM Service Reject shall trigger the UE to perform a Location Area Update or a Combined RA/LA Update procedure as specified in TS 23.060 [3] for the different Network Modes of Operation (NMO).

6. The UE initiates the CS call establishment procedure and the UE shall include the CSMO flag in the CM Service Request to the MSC.

7. The UE performs any remaining steps of the inter-RAT handover from E-UTRAN to UTRAN or GERAN as specified in TS 23.401 [2]. If the UE receives an empty Preserved Bearers List in the HO from EUTRAN Command and the UE included the CSFB PS HO preference IE or the Preserved EPS Bearers IE in the Extended Service Request, the UE determines from this that no bearers have been preserved. If the UE receives a non-empty Preserved Bearers List in the HO from E-UTRAN Command and the UE included the CSFB PS HO preference IE or the Preserved EPS Bearers IE in the Extended Service Request, then the UE determines from this that the bearers in the Preserved Bearers List have been preserved and that the UE can, if need be, handover such bearers to non-3GPP.

If the UE remains on UTRAN/GERAN after the CS voice call is terminated the UE performs normal mobility management procedures as defined in TS 23.060 [3] and TS 24.008 [21].

Figure 17:
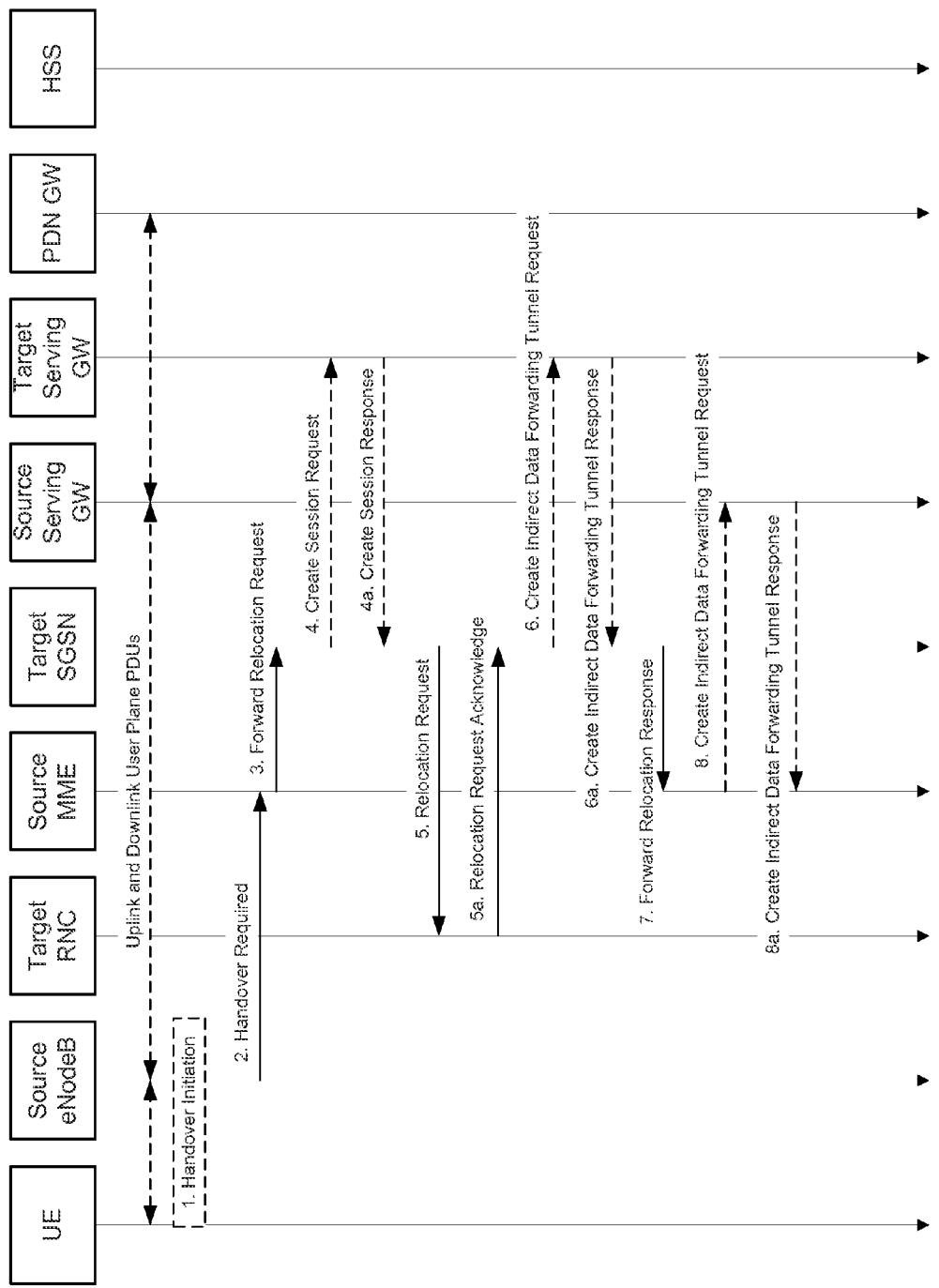
FIG. 17 is a diagram of an inter-RAT handover preparation phase.
Figure 18:
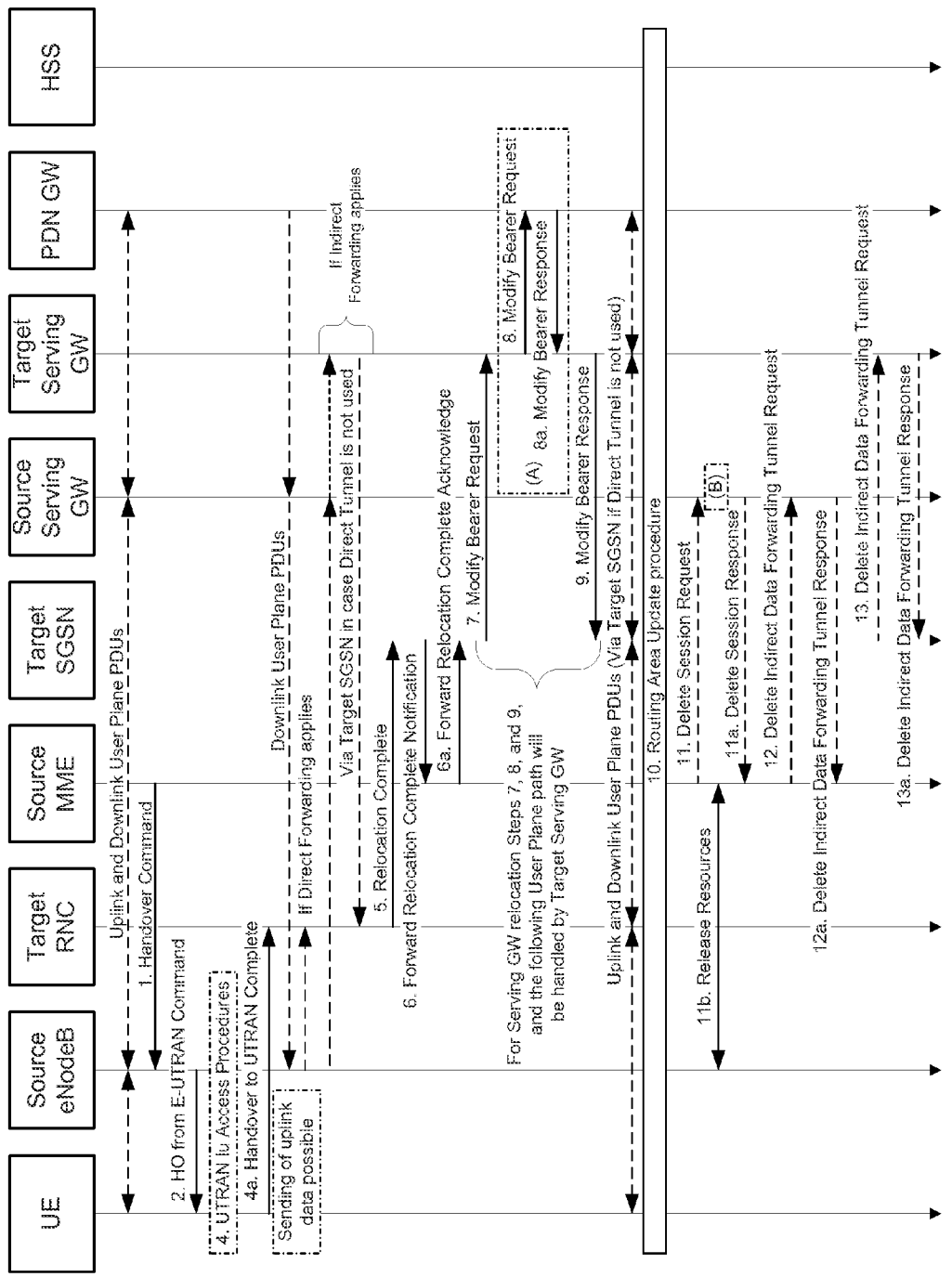
FIG. 18 is a diagram of an inter-RAT handover execution phase.

The following is to be read in conjunction with FIGS. 17 and 18, which are modified versions of FIG. 5.5.2.1.2-1 and FIG. 5.5.2.1.3-1 from TS 23.272, respectively.

[3GPP TS 23.272]7.3 Mobile Terminating Call in Active Mode—PS HO Supported

Authors: This procedure is modified similarly to the MO call.

Modifications to PS HO preparation phase (the example of handover to UTRAN is used here) in [3]:

[3GPP TS 23.401]5.5.2.1 E-UTRAN to UTRAN Iu Mode Inter RAT Handover 5.5.2.1.2 Preparation Phase 1. The source eNodeB decides to initiate an Inter-RAT handover to the target access network, UTRAN Iu mode. At this point both uplink and downlink user data is transmitted via the following: Bearer(s) between UE and source eNodeB, GTP tunnel(s) between source eNodeB, Serving GW and PDN GW.

If the UE has an ongoing emergency bearer service the source eNodeB shall not initiate PS handover to a UTRAN cell that is not IMS voice capable.

NOTE 1: The process leading to the handover decision is outside of the scope of this specification.

2. The source eNodeB sends a Handover Required (S1AP Cause, Target RNC Identifier, CSG ID, CSG access mode, Source to Target Transparent Container) message to the source MME to request the CN to establish resources in the target RNC, target SGSN and the Serving GW. The bearers that will be subject to data forwarding (if any) are identified by the target SGSN in a later step (see step 7 below). When the target cell is a CSG cell or a hybrid cell, the source eNodeB shall include the CSG ID of the target cell. If the target cell is a hybrid cell, the CSG access mode shall be indicated.

3. The source MME determines from the 'Target RNC Identifier' IE that the type of handover is IRAT Handover to UTRAN Iu mode. The Source MME initiates the Handover resource allocation procedure by sending a Forward Relocation Request (IMSI, Target Identification, CSG ID, CSG Membership Indication, MM Context, PDN Connections, MME Tunnel Endpoint Identifier for Control Plane, MME Address for Control plane, Source to Target Transparent Container, RAN Cause, MS Info Change Reporting Action (if available), CSG Information Reporting Action (if available), UE Time Zone, ISR Supported, Serving Network) message to the target SGSN. The information ISR Supported is indicated if the source MME and associated Serving GW are capable to activate ISR for the UE. When ISR is activated the message should be sent to the SGSN that maintains ISR for the UE when this SGSN is serving the target identified by the Target Identification. This message includes the PDN Connections active in the source system and that the MME decides to hand over to the target system, and for each PDN Connection includes the associated APN, the address and the uplink Tunnel endpoint parameters of the Serving GW for control plane, and a list of the EPS Bearer Contexts that the MME decides to hand over to the target system. RAN Cause indicates the S1AP Cause as received from source eNodeB. The old Serving Network is sent to target MME to support the target MME to resolve if Serving Network is changed.

The source MME shall perform access control by checking the UE's CSG subscription when CSG ID is provided by the source eNodeB. If there is no subscription data for this CSG ID or the CSG subscription is expired, and the target cell is a CSG cell, the source MME shall reject the handover with an appropriate cause.

The source MME includes the CSG ID in the Forward Relocation Request when the target cell is a CSG cell or hybrid cell. When the target cell is a hybrid cell, the CSG Membership Indication indicating whether the UE is a CSG member shall be included in the Forward Relocation Request message.

The target SGSN maps the EPS bearers to PDP contexts 1-to-1 and maps the EPS Bearer QoS parameter values of an EPS bearer to the Release 99 QoS parameter values of a bearer context as defined in Annex E Prioritization of PDP Contexts is performed by the target core network node, i.e. target SGSN.

The MM context contains security related information, e.g. supported ciphering algorithms as described in TS 29.274 [43]. Handling of security keys is described in TS 33.401 [41].

The target SGSN shall determine the Maximum APN restriction based on the APN Restriction of each bearer context in the Forward Relocation Request, and shall subsequently store the new Maximum APN restriction value.

4. The target SGSN determines if the Serving GW is to be relocated, e.g., due to PLMN change. If the Serving GW is to be relocated, the target SGSN selects the target Serving GW as described under clause 4.3.8.2 on "Serving GW selection function", and sends a Create Session Request message (IMSI, SGSN Tunnel Endpoint Identifier for Control Plane, SGSN Address for Control plane, PDN GW address(es) for user plane, PDN GW UL TEID(s) for user plane, PDN GW address(es) for control plane, and PDN GW TEID(s) for control plane, the Protocol Type over S5/S8, Serving Network) per PDN connection to the target Serving GW. The Protocol Type over S5/S8 is provided to Serving GW which protocol should be used over S5/S8 interface.

The target SGSN establishes the EPS Bearer context(s) in the indicated order. The SGSN deactivates, as provided in step 7 of the execution phase, the EPS Bearer contexts which cannot be established.

4a. The target Serving GW allocates its local resources and returns a Create Session Response (Serving GW address(es) for user plane, Serving GW UL TEID(s) for user plane, Serving GW Address for control plane, Serving GW TEID for control plane) message to the target SGSN.

5. The target SGSN requests the target RNC to establish the radio network resources (RABs) by sending the message Relocation Request (UE Identifier, Cause, CN Domain Indicator, Integrity protection information (i.e. IK and allowed Integrity Protection algorithms), Encryption information (i.e. CK and allowed Ciphering algorithms), RAB to be setup list, CSG ID, CSG Membership indication, Source RNC to Target RNC Transparent Container, Service Handover related information). If the Access Restriction is present in the MM context, the Service Handover related information shall be included by the target SGSN for the Relocation Request message in order for RNC to restrict the UE in connected mode to handover to the RAT prohibited by the Access Restriction.

For each RAB requested to be established, RABs To Be Setup shall contain information such as RAB ID, RAB parameters, Transport Layer Address, and Iu Transport Association. The RAB ID information element contains the NSAPI value, and the RAB parameters information element gives the QoS profile. The Transport Layer Address is the Serving GW Address for user plane (if Direct Tunnel is used) or the SGSN Address for user plane (if Direct Tunnel is not used), and the Iu Transport Association corresponds to the uplink Tunnel Endpoint Identifier Data in Serving GW or SGSN respectively.

Ciphering and integrity protection keys are sent to the target RNC to allow data transfer to continue in the new RAT/mode target cell without requiring a new AKA (Authentication and Key Agreement) procedure. Information that is required to be sent to the UE (either in the Relocation Command message or after the handover completion message) from RRC in the target RNC shall be included in the RRC message sent from the target RNC to the UE via the transparent container. More details are described in TS 33.401 [41].

The Target SGSN shall include the CSG ID and CSG Membership Indication when provided by the source MME in the Forward Relocation Request message.

In the target RNC radio and Iu user plane resources are reserved for the accepted RABs. Cause indicates the RAN Cause as received from source MME. The Source RNC to Target RNC Transparent Container includes the value from the Source to Target Transparent Container received from the source eNodeB.

If the target cell is a CSG cell, the target RNC shall verify the CSG ID provided by the target SGSN, and reject the handover with an appropriate cause if it does not match the CSG ID for the target cell. If the target cell is in hybrid mode, the target RNC may use the CSG Membership Indication to perform differentiated treatment for CSG and non-CSG members.

5a. The target RNC allocates the resources and returns the applicable parameters to the target SGSN in the message Relocation Request Acknowledge (Target RNC to Source RNC Transparent Container, RABs setup list, RABs failed to setup list). Upon sending the Relocation Request Acknowledge message the target RNC shall be prepared to receive downlink GTP PDUs from the Serving GW, or Target SGSN if Direct Tunnel is not used, for the accepted RABs.

Each RABs setup list is defined by a Transport Layer Address, which is the target RNC Address for user data, and the Iu Transport Association, which corresponds to the downlink Tunnel Endpoint Identifier for user data.

Any EPS Bearer contexts for which a RAB was not established are maintained in the target SGSN and the UE. These EPS Bearer contexts shall be deactivated by the target SGSN via explicit SM procedures upon the completion of the routing area update (RAU) procedure.

6. If 'Indirect Forwarding' and relocation of Serving GW apply and Direct Tunnel is used the target SGSN sends a Create Indirect Data Forwarding Tunnel Request message (Target RNC Address and TEID(s) for DL data forwarding) to the Serving GW. If 'Indirect Forwarding' and relocation of Serving GW apply and Direct Tunnel is not used, then the target SGSN sends a Create Indirect Data Forwarding Tunnel Request message (SGSN Address and TEID(s) for DL data forwarding) to the Serving GW.

Indirect forwarding may be performed via a Serving GW which is different from the Serving GW used as the anchor point for the UE.

6a. The Serving GW returns a Create Indirect Data Forwarding Tunnel Response (Cause, Serving GW Address(es) and Serving GW DL TEID(s) for data forwarding) message to the target SGSN.

7. The target SGSN sends the message Forward Relocation Response (Cause, SGSN Tunnel Endpoint Identifier for Control Plane, SGSN Address for Control Plane, Target to Source Transparent Container, Cause, RAB Setup Information, Additional RAB Setup Information, Address(es) and TEID(s) for User Traffic Data Forwarding, Serving GW change indication) to the source MME. Serving GW change indication indicates a new Serving GW has been selected. The Target to Source Transparent Container contains the value from the Target RNC to Source RNC Transparent Container received from the target RNC.

The IE 'Address(es) and TEID(s) for User Traffic Data Forwarding' defines the destination tunneling endpoint for data forwarding in target system, and it is set as follows:

If 'Direct Forwarding' applies, or if 'Indirect Forwarding' and no relocation of Serving GW apply and Direct Tunnel is used, then the IE 'Address(es) and TEID(s) for User Traffic Data Forwarding' contains the addresses and GTP-U tunnel endpoint parameters to the Target RNC received in step 5a.

If 'Indirect Forwarding' and relocation of Serving GW apply, then the IE 'Address(es) and TEID(s) for User Traffic Data Forwarding' contains the addresses and DL GTP-U tunnel endpoint parameters to the Serving GW received in step 6. This is independent from using Direct Tunnel or not.

If 'Indirect Forwarding' applies and Direct Tunnel is not used and relocation of Serving GW does not apply, then the IE 'Address(es) and TEID(s) for User Traffic Data Forwarding' contains the DL GTPU tunnel endpoint parameters to the Target SGSN.

8. If "Indirect Forwarding" applies, the Source MME sends the message Create Indirect Data Forwarding Tunnel Request (Address(es) and TEID(s) for Data Forwarding (received in step 7)), EPS Bearer ID(s)) to the Serving GW used for indirect forwarding.

Indirect forwarding may be performed via a Serving GW which is different from the Serving GW used as the anchor point for the UE.

8a. The Serving GW returns the forwarding parameters by sending the message Create Indirect Data Forwarding Tunnel Response (Cause, Serving GW Address(es) and TEID(s) for Data Forwarding). If the Serving GW doesn't support data forwarding, an appropriate cause value shall be returned and the Serving GW Address(es) and TEID(s) will not be included in the message.

[3GPP TS 23.401] 5.5.2.13 Execution Phase

NOTE: For a PMIP-based S5/S8, procedure steps (A) and (B) are defined in TS 23.402 [2]. Step (B) shows PCRF interaction in the case of PMIP-based S5/S8. Steps 8 and 8a concern GTP based S5/S8

The source eNodeB continues to receive downlink and uplink user plane PDUs.

1. The source MME completes the preparation phase towards source eNodeB by sending the message Handover Command (Target to Source Transparent Container, E-RABs to Release List, Bearers Subject to Data Forwarding List, Preserved Bearers List). The "Bearers Subject to Data forwarding list" IE may be included in the message and it shall be a list of 'Address(es) and TEID(s) for user traffic data forwarding' received from target side in the preparation phase (Step 7 of the preparation phase) when 'Direct Forwarding' applies, or the parameters received in Step 8a of the preparation phase when 'Indirect Forwarding' applies.

If the UE receives an empty Preserved Bearers List in the HO from E-UTRAN Command and the UE included the CSFB PS HO preference IE or the Preserved EPS Bearers IE in the Extended Service Request, the UE determines from this that no bearers have been preserved. If the UE receives a nonempty Preserved Bearers List in the HO from E-UTRAN Command and the UE included the CSFB PS HO preference IE or the Preserved EPS Bearers IE in the Extended Service Request, then the UE determines from this that the bearers in the Preserved Bearers List have been preserved and that the UE can, if need be, handover such bearers to non-3GPP.

The source eNodeB initiates data forwarding for bearers specified in the "Bearers Subject to Data Forwarding List". The data forwarding may go directly to target RNC or alternatively go via the Serving GW so decided by source MME and or/target SGSN in the preparation phase.

2. The source eNodeB will give a command to the UE to handover to the target access network via the message HO from E-UTRAN Command. This message includes a transparent container including radio aspect parameters that the target RNC has set-up in the preparation phase. The details of this E-UTRAN specific signalling are described in TS 36.300 [5]. This message includes the Preserved Bearers List.

Upon the reception of the HO from E-UTRAN Command message containing the Handover Command message, the UE shall associate its bearer IDs to the respective RABs based on the relation with the NSAPI and shall suspend the uplink transmission of the user plane data.

3. Void.

4. The UE moves to the target UTRAN Iu (3G) system and executes the handover according to the parameters provided in the message delivered in step 2. The procedure is the same as in step 6 and 8 in clause 5.2.2.2 in TS 43.129 [8] with the additional function of association of the received RABs and existing Bearer Id related to the particular NSAPI.

The UE may resume the user data transfer only for those NSAPIs for which there are radio resources allocated in the target RNC.

The following are example standard changes may be carried out to implement explicit bearer indication from UE at CSFB triggering and UE triggered handover to non-3GPP, described above. Additions to the standard are shown as underlined text and deletions from the standard are shown using strikeout text.

[3GPP TS 24301]5.6.1 Service Request Procedure 5.6.1.1 General

The purpose of the service request procedure is to transfer the EMM mode from EMM-IDLE to EMM-CONNECTED mode and establish the radio and S1 bearers when uplink user data or signalling is to be sent. Another purpose of this procedure is to invoke MO/MT CS fallback or 1xCS fallback procedures.

This procedure is used when:

the network has downlink signalling pending;

the UE has uplink signalling pending;

the UE or the network has user data pending and the UE is in EMM-IDLE mode;

the UE in EMM-IDLE or EMM-CONNECTED mode has requested to perform mobile originating/terminating CS fallback or 1xCS fallback;

the network has downlink cdma2000® signalling pending; or the UE has uplink cdma2000® signalling pending.

The service request procedure is initiated by the UE, however, for the downlink transfer of signalling, cdma2000® signalling or user data in EMM-IDLE mode, the trigger is given by the network by means of the paging procedure (see subclause 5.6.2).

The UE shall invoke the service request procedure when:

a) the UE in EMM-IDLE mode receives a paging request with CN domain indicator set to "PS" from the network;

b) the UE, in EMM-IDLE mode, has pending user data to be sent;

c) the UE, in EMM-IDLE mode, has uplink signalling pending;

d) the UE in EMM-IDLE or EMM-CONNECTED mode is configured to use CS fallback and has a mobile originating CS fallback request from the upper layer;

e) the UE in EMM-IDLE mode is configured to use CS fallback and receives a paging request with CN domain indicator set to "CS", or the UE in EMM-CONNECTED mode is configured to use CS fallback and receives a CS SERVICE NOTIFICATION message;

f) the UE EMM-IDLE or EMM-CONNECTED mode is configured to use 1xCS fallback and has a mobile originating 1xCS fallback request from the upper layer;

g) the UE in EMM-CONNECTED mode is configured to use 1xCS fallback and accepts cdma2000® signalling messages containing a 1xCS paging request received over E-UTRAN;

h) the UE, in EMM-IDLE mode, has uplink cdma2000® signalling pending to be transmitted over E-UTRAN;

i) the UE, in EMM-IDLE or EMM-CONNECTED mode, is configured to use 1xCS fallback, accepts cdma2000® signalling messages containing a 1xCS paging request received over cdma2000® 1xRTT, and the network supports dual Rx CSFB or provide CS fallback registration parameters (see 3GPP TS 36.331 [22]);

j) the UE, in EMM-IDLE or EMM-CONNECTED mode, has uplink cdma2000® signalling pending to be transmitted over cdma2000® 1xRTT, and the network supports dual Rx CSFB or provide CS fallback registration parameters (see 3GPP TS 36.331 [22]); or k) the UE performs an inter-system change from S101 mode to S1 mode and has user data pending.

If one of the above criteria to invoke the service request procedure is fulfilled, then the service request procedure may only be initiated by the UE when the following conditions are fulfilled:

its EPS update status is EUI UPDATED, and the TAI of the current serving cell is included in the TAI list; and no EMM specific procedure is ongoing.

[3GPP TS 24.301] 5.6.1.2 Service Request Procedure Initiation

For cases a, b, c, h and k, in subclause 5.6.1.1, if the UE is not configured for NAS signalling low priority, the UE initiates the service request procedure by sending a SERVICE REQUEST message to the MME, starts the timer T3417, and enters the state EMM-SERVICE-REQUEST-INITIATED.

For cases a, b, c, h and k, if the UE is configured for NAS signalling low priority, and the last received ATTACH ACCEPT message or TRACKING AREA UPDATE ACCEPT message from the network indicated that the network supports use of EXTENDED SERVICE REQUEST for packet services, the UE shall send an EXTENDED SERVICE REQUEST message with service type set to "packet services via S1". If the last received ATTACH ACCEPT message or TRACKING AREA UPDATE ACCEPT message from the network did not indicate that the network supports use of EXTENDED SERVICE REQUEST for packet services, the UE shall instead send a SERVICE REQUEST message. After sending the SERVICE REQUEST message or EXTENDED SERVICE REQUEST message with service type set to "packet services via S1", the UE shall start T3417 and enter the state EMM-SERVICE-REQUEST-INITIATED.

For case d in subclause 5.6.1.1, the UE shall send an EXTENDED SERVICE REQUEST message, start T3417ext and enter the state EMM-SERVICE-REQUEST-INITIATED. The UE may include the CSFB PS HO Preference IE or the Preserved EPS Bearers IE.

For case e in subclause 5.6.1.1:

if the UE is in EMM-IDLE mode, the UE shall send an EXTENDED SERVICE REQUEST message, start T3417ext and enter the state EMM-SERVICE-REQUEST-INITIATED. The UE may include the CSFB PS HO Preference IE or the Preserved EPS Bearers IE.

if the UE is in EMM-CONNECTED mode and if the UE accepts the paging, the UE shall send an EXTENDED SERVICE REQUEST message with the CSFB response IE indicating "CS fallback accepted by the UE", start T3417ext and enter the state EMM-SERVICE-REQUEST-INITI- ATED and may include the CSFB PS HO Preference IE or the Preserved EPS Bearers IE; or if the UE is in EMM-CONNECTED mode and if the UE rejects the paging, the UE shall send an EXTENDED SERVICE REQUEST message with the CSFB response IE indicating "CS fallback rejected by the UE" and enter the state EMM-REGISTERED.NORMAL-SERVICE. The network shall not initiate CS fallback procedures.

For cases f, g, i and j in subclause 5.6.1.1, the UE shall send an EXTENDED SERVICE REQUEST message, start T3417 and enter the state EMM-SERVICE-REQUEST-INITIATED. The UE may include the CSFB PS HO Preference or the Preserved EPS Bearers IE.

[3GPP TS 24.301] 5.6.1.3 EMM Common Procedure Initiation

Upon receipt of the SERVICE REQUEST or EXTENDED SERVICE REQUEST message, the MME may initiate the EMM common procedures e.g. the authentication procedure and security mode control procedure.

[3GPP TS 24.301]5.6.1.4 Service Request Procedure Accepted by the Network

For cases a, b, c, h and k in subclause 5.6.1.1, the UE shall treat the indication from the lower layers that the user plane radio bearer is set up as successful completion of the procedure. The UE shall stop the timer T3417 and enter the state EMM-REGISTERED.

If the service type information element in the EXTENDED SERVICE REQUEST message indicates "mobile terminating CS fallback or 1×CS fallback" and the CSFB response IE, if included, indicates "CS fallback accepted by the UE", or if the service type information element in the EXTENDED SERVICE REQUEST message indicates "mobile originating CS fallback or 1×CS fallback" or "mobile originating CS fallback emergency call or 1×CS fallback emergency call", the network initiates CS fallback or 1×CS fallback procedures. If the EPS bearer context status IE, is included in the EXTENDED SERVICE REQUEST message, the network shall deactivate all those EPS bearer contexts locally (without peer-to-peer signalling between the network and the UE) which are active on the network side but are indicated by the UE as being inactive. If the CSFB PS HO Preference IE or the Preserved EPS Bearers IE is included in the EXTENDED SERVICE REQUEST message, the network in initiating CS fallback or 1×CS fallback procedures, shall exclude the bearers indicated in the Preserved EPS IE or the bearers indicated in the CSFB PS HO Preference IE from being handed over to GERAN or/UTRAN. Instead the network shall preserve the indicated bearers within E-UTRAN access.

If the EXTENDED SERVICE REQUEST message is for CS fallback or 1×CS fallback and the UE had included the CSFB PS HO Preference IE or the Preserved EPS Bearers IE, then the UE shall consider indications from lower layer that the Preserved Bearers List has been received as part of an inter-system PS Handover to GERAN or UTRAN (see 3GPP TS 36.331 [22]), as acknowledgement that the MME has preserved within the E-UTRAN system the bearers identified in the Preserved Bearers List.

If the SERVICE REQUEST message or the EXTENDED SERVICE REQUEST message for packet services, was sent in a CSG cell and the CSG subscription has expired or was removed for a UE, but the UE has a PDN connection for emergency bearer services established, the network shall accept the SERVICE REQUEST message or the EXTENDED SERVICE REQUEST message for packet services and deactivate all nonemergency EPS bearers locally. The emergency EPS bearers shall not be deactivated.

For cases d in subclause 5.6.1.1, and for case e in subclause 5.6.1.1 when the CSFB response was set to "CS fallback accepted by the UE", the UE shall treat the indication from the lower layers that the inter-system change from S1 mode to A/Gb or Iu mode is completed as successful completion of the procedure. The EMM sublayer in the UE shall indicate to the MM sublayer that the CS fallback procedure has succeeded. The UE shall stop the timer T3417ext and enter the state EMM-REGISTERED.NO-CELL-AVAILABLE.

If the service request procedure was initiated in EMM-IDLE mode and an EXTENDED SERVICE REQUEST message was sent in a CSG cell and the CSG subscription has expired or was removed for the UE, the network need not perform CSG access control if the service type information element indicates "mobile originating CS fullback emergency call or 1×CS fallback emergency call".

For cases f and g in subclause 5.6.1.1:

if the UE receives the indication from the lower layers that the signalling connection is released with the redirection indication to cdma2000® 1× access network or the indication from the lower layers that a change to cdma2000® 1× access network for 1×CS fallback has started (see 3GPP TS 36.331 [22]), the UE shall consider the service request procedure successfully completed, stop timer T3417 and enter the state EMM-REGISTERED.NO-CELL-AVAILABLE;

if the UE receives the dual Rx/Tx redirection indication from the lower layers (see 3GPP TS 36.3311 [22]), the UE shall select cdma2000® 1× access network for 1×CS fallback, consider the service request procedure successfully completed, stop timer T3417 and enter the state EMM-REGISTERED.NORMALSERVICE; and if the UE receives a cdma2000® signalling message indicating 1×CS fallback rejection by cdma2000® 1× access network, the UE shall abort the service request procedure, stop timer T3417 and enter the state EMM-REGISTERED-.NORMAL-SERVICE.

For cases i and j in subclause 5.6.1.1, if the UE receives the indication from the lower layers that the signaling connection is released, the UE shall consider the service request procedure successfully completed, stop tinier T3417 and enter the state EMM-REGISTERED.NO-CELL-AVAILABLE.

If the SERVICE REQUEST message or an EXTENDED SERVICE REQUEST message for packet services was used, the UE shall locally deactivate the EPS bearer contexts that do not have a user plane radio bearer established upon successful completion of the service request procedure.

If the EXTENDED SERVICE REQUEST message is for CS fallback or 1×CS fallback and radio bearer establishment takes place during the procedure, the UE upon receiving a lower layer indication of radio bearer establishment, shall locally deactivate the EPS bearer contexts that do not have a user plane radio bearer established except for bearers that UE have indicated in the Preserved EPS Bearers IE or in the CSFB PS HO Preference information element, if such information had been provided in the EXTENDED SERVICE REQUEST. The UE does not perform local deactivation of EPS bearer contexts upon receiving an indication of inter-system change from lower layers.

If the EXTENDED SERVICE REQUEST message is for packet services and radio bearer establishment does not take place during the procedure, the UE does not perform local deactivation of the EPS bearer context. The UE does not perform local deactivation of EPS bearer contexts upon receiving an indication of inter-system change from lower layers.

When the E-UTRAN fails to establish radio bearers for one or more EPS bearer contexts, then the MME shall locally deactivate the EPS bearer contexts corresponding to the failed radio bearers based on the lower layer indication from the UTRAN, without notifying the UE.

The following are standard changes that may be made to facilitate a UE providing an option to handover indicated EPS bearers to non-3GPP (i.e., WLAN) instead of GERAN/UTRAN. The following are the proposed changes on implementation of the CSFB PS HO preference indication in the ESR message, which are made in reference to FIGS. 19 and 20, which represent changes to table 8.2.15.1 of 3GPP TS 24.301 and the addition of FIG. 9.9.x.y.z, respectively.

[3GPP TS 24301]8.2.15 Extended Service Request 8.2.15.1 Message Definition

This message is sent by the UE to the network to initiate a CS fallback or 1×CS fallback call or respond to a mobile terminated CS fallback or 1×CS fallback request from the network. See table 8.7.151

Message type: EXTENDED SERVICE REQUEST

Significance: dual

Direction: UE to network 8.2.15.4 CSFB PS HO preference

This IE shall be included if the UE wants to indicate its preference on handling of EPS bearers in intersystem change as part of CS fallback or 1×CSfallback.

. . .

9.9.x.y CSFB PS HO preference

The purpose of the CSFB PS HO preference information element is for the UE to indicate for the identified EPS bearer, its preferred handling by the network of that identified bearer in an inter-system change as part of CS fallback or 1×CSfallback.

The CSFB PS HO preferences information element is coded as shown in FIG. 9.9.x.y.z [FIG. 20] and table 9.9.x.y.z [below].

The CSFB PS HO reference information element is a type 4 information element with 4 octets length.

TABLE 9.9.x.y.z

| CSFB PS HO preference information element |
|---|
| Bit 1 to 5 of octet 3 are spare and shall be coded as zero |
| EPS Bearer identity value 7 (octet 3, bit 8) |
| 0 Preference is to keep corresponding EPS bearer, indicated by the EPS bearer identity value, in 3GPP access |
| 1 Preference is to keep corresponding EPS bearer, indicated by the EPS bearer identity value, in non-3GPP access |
| EPS Bearer identity value 6 (octet 3, bit 7) |
| 0 Preference is to keep corresponding EPS bearer, indicated by the EPS bearer identity value, in 3GPP access |
| 1 Preference is to keep corresponding EPS bearer, indicated by the EPS bearer identity value, in non-3GPP access |
| EPS Bearer identity value 5 (octet 3, bit 6) |
| 0 Preference is to keep corresponding EPS bearer, indicated by the EPS bearer identity value, in 3GPP access |
| 1 Preference is to keep corresponding EPS bearer, indicated by the EPS bearer identity value, in non-3GPP access |
| EPS Bearer identity value 15 (octet 4, bit 8) |
| 0 Preference is to keep corresponding EPS bearer, indicated by the EPS bearer identity value, in 3GPP access |
| 1 Preference is to keep corresponding EPS bearer, indicated by the EPS bearer identity value, in non-3GPP access |
| EPS Bearer identity value 14 (octet 4, bit 7) |
| 0 Preference is to keep corresponding EPS bearer, indicated by the EPS bearer identity value, in 3GPP access |
| 1 Preference is to keep corresponding EPS bearer, indicated |

TABLE 9.9.x.y.z-continued

| CSFB PS HO preference information element |
|---|
| by the EPS bearer identity value, in non-3GPP access |
| EPS Bearer identity value 13 (octet 4, bit 6) |
| 0 Preference is to keep corresponding EPS bearer, indicated by the EPS bearer identity value, in 3GPP access |
| 1 Preference is to keep corresponding EPS bearer, indicated by the EPS bearer identity value, in non-3GPP access |
| EPS Bearer identity value 12 (octet 4, bit 5) |
| 0 Preference is to keep corresponding EPS bearer, indicated by the EPS bearer identity value, in 3GPP access |
| 1 Preference is to keep corresponding EPS bearer, indicated by the EPS bearer identity value, in non-3GPP access |
| EPS Bearer identity value 11 (octet 4, bit 4) |
| 0 Preference is to keep corresponding EPS bearer, indicated by the EPS bearer identity value, in 3GPP access |
| 1 Preference is to keep corresponding EPS bearer, indicated by the EPS bearer identity value, in non-3GPP access |
| EPS Bearer identity value 10 (octet 4, bit 3) |
| 0 Preference is to keep corresponding EPS bearer, indicated by the EPS bearer identity value, in 3GPP access |
| 1 Preference is to keep corresponding EPS bearer, indicated by the EPS bearer identity value, in non-3GPP access |
| EPS Bearer identity value 9 (octet 4, bit 2) |
| 0 Preference is to keep corresponding EPS bearer, indicated by the EPS bearer identity value, in 3GPP access |
| 1 Preference is to keep corresponding EPS bearer, indicated by the EPS bearer identity value, in non-3GPP access |
| EPS Bearer identity value 8 (octet 4, bit 1) |
| 0 Preference is to keep corresponding EPS bearer, indicated by the EPS bearer identity value, in 3GPP access |
| 1 Preference is to keep corresponding EPS bearer, indicated by the EPS bearer identity value, in non-3GPP access |

In an alternate example, the UE provides an option to preserve the indicated EPS bearers and not hand them over to GERAN/UTRAN. The following are the proposed changes on implementation of the Preserved EPS Bearers indication in the ESR message. The following is made with reference to FIG. 21-24.

[3GPP TS 24.301]8.2.15 Extended Service Request 8.2.15.1 Message Definition

This message is sent by the UE to the network to initiate a CS fallback or 1×CS fallback call or respond to a mobile terminated CS fallback or 1×CS fallback request from the network. See table 8.2.15.1 [FIG. 21].

Message type: EXTENDED SERVICE REQUEST

Significance: dual

Direction: UE to network 8.2.15.4 Preserved EPS Bearers

This IE shall be included if the UE wants to indicate its preference on whether indicated EPS bearers are to be preserved upon inter system change as part of CS fallback or 1×CS fallback.

. . .

9.9.X.Y Preserved EPS Bearers

The purpose of the Preserved EPS Bearers information element is for the UE to indicate for the identified EPS bearer, whether as part of CS fallback or 1×CSfallback, that EPS bearer contexts is to be handed over to GERAN or UTRAN or to be preserved within the E-UTRAN.

The Preserved EPS Bearers information element is coded as shown in FIG. 9.9.X.Y.1 [FIG. 22] and table 9.9.X.Y.1 [below].

The Preserved EPS Bearers information element is a type 4 information element with 4 octets length.

TABLE 9.9.X.Y.1

Preserved EPS Bearers indication information element

Bit 1 to 5 of octet 3 are spare and shall be coded as zero
EPS Bearer identity value 7 (octet 3, bit 8)
0 Corresponding EPS bearer, indicated by the EPS bearer identity value, can be handed over to GERAN or UTRAN as part of CS fallback
1 Corresponding EPS bearer, indicated by the EPS bearer identity value, shall not be handed over to GERAN or UTRAN as part of CS fallback but be preserved within E-UTRAN system.
EPS Bearer identity value 6 (octet 3, bit 7)
0 Corresponding EPS bearer, indicated by the EPS bearer identity value, can be handed over to GERAN or UTRAN as part of CS fallback
1 Corresponding EPS bearer, indicated by the EPS bearer identity value, shall not be handed over to GERAN or UTRAN as part of CS fallback but be preserved within E-UTRAN system.
EPS Bearer identity value 5 (octet 3, bit 6)
0 Corresponding EPS bearer, indicated by the EPS bearer identity value, can be handed over to GERAN or UTRAN as part of CS fallback
1 Corresponding EPS bearer, indicated by the EPS bearer identity value, shall not be handed over to GERAN or UTRAN as part of CS fallback but be preserved within E-UTRAN system.
EPS Bearer identity value 15 (octet 4, bit 8)
0 Corresponding EPS bearer, indicated by the EPS bearer identity value, can be handed over to GERAN or UTRAN as part of CS fallback
1 Corresponding EPS bearer, indicated by the EPS bearer identity value, shall not be handed over to GERAN or UTRAN as part of CS fallback but be preserved within E-UTRAN system.
EPS Bearer identity value 14 (octet 4, bit 7)
0 Corresponding EPS bearer, indicated by the EPS bearer identity value, can be handed over to GERAN or UTRAN as part of CS fallback
1 Corresponding EPS bearer, indicated by the EPS bearer identity value, shall not be handed over to GERAN or UTRAN as part of CS fallback but be preserved within E-UTRAN system.
EPS Bearer identity value 13 (octet 4, bit 6)
0 Corresponding EPS bearer, indicated by the EPS bearer identity value, can be handed over to GERAN or UTRAN as part of CS fallback
1 Corresponding EPS bearer, indicated by the EPS bearer identity value, shall not be handed over to GERAN or UTRAN as part of CS fallback but be preserved within E-UTRAN system.
EPS Bearer identity value 12 (octet 4, bit 5)
0 Corresponding EPS bearer, indicated by the EPS bearer identity value, can be handed over to GERAN or UTRAN as part of CS fallback
1 Corresponding EPS bearer, indicated by the EPS bearer identity value, shall not be handed over to GERAN or UTRAN as part of CS fallback but be preserved within E-UTRAN system.
EPS Bearer identity value 11 (octet 4, bit 4)
0 Corresponding EPS bearer, indicated by the EPS bearer identity value, can be handed over to GERAN or UTRAN as part of CS fallback
1 Corresponding EPS bearer, indicated by the EPS bearer identity value, shall not be handed over to GERAN or UTRAN as part of CS fallback but be preserved within E-UTRAN system.
EPS Bearer identity value 10 (octet 4, bit 3)
0 Corresponding EPS bearer, indicated by the EPS bearer identity value, can be handed over to GERAN or UTRAN as part of CS fallback
1 Corresponding EPS bearer, indicated by the EPS bearer identity value, shall not be handed over to GERAN or UTRAN as part of CS fallback but be preserved within E-UTRAN system.
EPS Bearer identity value 9 (octet 4, bit 2)
0 Corresponding EPS bearer, indicated by the EPS bearer identity value, can be handed over to GERAN or UTRAN as part of CS fallback
1 Corresponding EPS bearer, indicated by the EPS bearer identity value, shall not be handed over to GERAN or UTRAN as part of CS fallback but be preserved within E-UTRAN system.
EPS Bearer identity value 8 (octet 4, bit 1)
0 Corresponding EPS bearer, indicated by the EPS bearer identity value, can be handed over to GERAN or UTRAN as part of CS fallback
1 Corresponding EPS bearer, indicated by the EPS bearer identity value, shall not be handed over to GERAN or UTRAN as part of CS fallback but be preserved within E-UTRAN system.

The followings standard changes pertain to handover command modifications to carry out the foregoing.

[3GPP RS 36.331] 5.4.3.3 Reception of the MobilityFromEUTRACommand by the UE

The UE shall be able to receive a MobilityFromEUTRACommand message and perform a cell change order to GERAN, even if no prior UE measurements have been performed on the target cell.

The UE shall:
1> stop timer T310, if running;
1> if the MobilityFromEUTRACommand message includes the purpose set to handover:
　2> if the targetRAT-Type is set to utra or germ:
　　3> consider inter-RAT mobility as initiated towards the RAT indicated by the targetRAT-Type included in the MobilityfromEUTRACommand message;
　　3> forward the nas-SecurityParamFromEUTRA to the upper layers;
　　3> access the target cell indicated in the inter-RAT message in accordance with the specifications of the target RAT;
　　3> if the targetRAT-Type is set to germ:
　　　4> use the contents of systemInformation, if provided for PS Handover, as the system information to begin access on the target GERAN cell;
　NOTE 1: If there are DRBs for which no radio bearers are established in the target RAT as indicated in the targetRAT-MessageContainer in the message, the E-UTRA RRC part of the UE does not indicate the release of the concerned DRBs to the upper layers. Upper layers may derive which bearers are not established from information received from the AS of the target RAT.
　NOTE 2: In case of SR-VCC, the DRB to be replaced is specified in [61].
　2> else if the targetRAT-Type is set to cdma2000-1xRTT or cdma2000-HRPD:
　　3> forward the targetRAT-Type and the targetRAT-MessageContainer to the CDMA2000 upper layers for the UE to access the cell(s) indicated in the inter-RAT message in accordance with the specifications of the CDMA2000 target-RAT;
　2> forward the preservedBearerList, if included, to the upper layers:
1> else if the MobilityFromEUTRACommand message includes the purpose set to cellChangeOrder:
　2> start timer T304 with the timer value set to t304, as included in the MobilityFromEUTRACommand message;
　2> if the targetRAT-Type is set to geran:
　　3> if networkControlOrder is included in the MobilityFromEUTRACommand message:
　　　4> apply the value as specified in TS 44.060 [36];
　　3> else:
　　　4> acquire networkControlOrder and apply the value as specified in TS 44.060 [36];
　　3> use the contents of systemInformation, if provided, as the system information to begin access on the target GERAN cell;
　NOTE 3: The systemInformation is constructed in the same way as in 2G to 2G NACC, i.e. the PSI messages are encoded as such, whereas the S1 messages exclude 2 octets of headers, see TS 44.060[36],
　2> establish the connection to the target cell indicated in the CellChangeOrder;
　NOTE 4: The criteria for success or failure of the cell change order to GERAN are specified in TS 44.060[36].
1> if the MobilityFromEUTRACommand message includes the purpose set to c-CSFB:
　2> if messageContCDMA2000-1xRTT is present:
　　3> forward the messageContCDMA2000-1xRTT to the CDMA2000 upper layers for the UE to access the cell(s) indicated in the inter-RAT message in accordance with the specification of the target RAT;

2> if mobilityCDMA2000-HRPD is present and is set to handover:
　3> forward the messageContCDMA2000-HRPD to the CDMA2000 upper layers for the UE to access the cell(s) indicated in the inter-RAT message in accordance with the specification of the target RAT;
2> if mobilityCDMA2000-HRPD is present and is set to redirection:
　3> forward the redirectedCarrierInfoCDMA2000-HRPD to the CDMA2000 upper layers;
NOTE 5: When the CDMA2000 upper layers in the UE receive both the messageContCDMA2000-1×RTT and messageContCDMA2000-HRPD the UE performs concurrent access to both CDMA2000 1×RTT and CDMA2000 HRPD RAT.

Modification of the MobilityFromEUTRACommand

In one example, the MobilityFromEUTRACommand message of 3GPP RS 36.311 may be modified to include a preservedBearersList. The preservedBearerslist may be a bitmap field representing the EPS Bearers that are preserved from handover to the target RAT. The leading bit of the bitmap corresponds to EPS Bearer Identity 0, the next bit to EPS Bearer Identity 1, and so on. The value of the bit is set to "1" if the EPS Bearer Context is preserved from handover to the target RAT, and set to "0" is the EPS Bearer Context is not presevered from handover to the target RAT.

In another example, the preservedBearersList may be defined as within 24.301 thus avoiding 36.331 including concepts such as 'EPS Bearer Contexts preserved from handover to the target RAT'. Within 36.331 thepreservedBearersList would simply be a 2 octet field that is carried transparently by the access stratum.

Bearer Information Provided in PCO

The following modifications and additions may be carried out to describe how the PCO may carry bearer information. In one example, 3GPP TS 24.008 may be modified to include a protocol configuration options information element as follows:

Configuration Protocol (Octet 3)
Bits
3 2 1
0 0 0 PPP for use with IP PDP type or IP PDN type (see 3GPP TS 24.301 [120])

All other values are interpreted as PPP in this version of the protocol.

After octet 3, i.e. from octet 4 to octet z, two logical lists are defined:
　the Configuration protocol options list (octets 4 to w), and
　the Additional parameters list (octets w+1 to z).

Configuration Protoco Options List (Octets 4 to w)

The configuration protocol options list contains a variable number of logical units, they may occur in an arbitrary order within the configuration protocol options list.

Each unit is of variable length and consists of a:
　protocol identifier (2 octets);
　the length of the protocol identifier contents of the unit (1 octet); and
　the protocol identifier contents itself (n octets), The protocol identifier field contains the hexadecimal coding of the configuration protocol identifier. Bit 8 of the first octet of the protocol identifier field contains the most significant bit and bit 1 of the second octet of the protocol identifier field contains the least significant bit.

If the configuration protocol options list contains a protocol identifier that is not supported by the receiving entity the corresponding unit shall be discarded.

The length of the protocol identifier contents field contains the binary coded representation of the length of the protocol identifier contents field of a unit. The first bit in transmission order is the most significant bit.

The protocol identifier contents field of each unit contains information specific to the configuration protocol specified by the protocol identifier.

At least the following protocol identifiers (as defined in RFC 3232 [103]) shall be supported in this version of the protocol:
　C021H (LCP);
　C023H (PAP);
　C223H (CHAP); and
　8021H (IPCP).

The support of other protocol identifiers is implementation dependent and outside the scope of the present document.

The protocol identifier contents field of each unit corresponds to a "Packet" as defined in RFC 1661 [102] that is stripped off the "Protocol" and the "Padding" octets.

The detailed coding of the protocol identifier contents field is specified in the RFC that is associated with the protocol identifier of that unit.

Additional Parameters List (Octets w+1 to z)

The additional parameters list is included when special parameters and/or requests (associated with a PDP context) need to be transferred between the MS and the network. These parameters and/or requests are not related to a specific configuration protocol (e.g. PPP), and therefore are not encoded as the "Packets" contained in the configuration protocol options list.

The additional parameters list contains a list of special parameters, each one in a separate container. The type of parameter carried in a container is identified by a specific container identifier. In this version of the protocol, the following container identifiers are specified:

MS to Network Direction:
　0001H (P-CSCF IPv6 Address Request);
　0002H (IM CN Subsystem Signaling Flag);
　0003H (DNS Server IPv6 Address Request)
　0004H (Not Supported)
　0005H (MS Support of Network Requested Bearer Control indicator);
　0006H (Reserved)
　0007H (DSMIPv6 Home Agent Address Request;
　0008H (DSMIPv6 Home Network Prefix Request);
　0009H (DSMIPv6 IPv4 Home Agent Address Request);
　000AH (IP address allocation via NAS signalling)
　000BH (IPv4 address allocation via DHCPv4);
　000CH (P-CSCF IPv4 Address Request);
　000DH (DNS Server IPv4 Address Request);
　000EH (MSISDN Request);
　000FH (IFOM-Support-Request);
　0010H (IPv4 Link MTU Request); and
　0011H (Bearer CSFB PS HO Preference MS); and
　FF00H to FFFFH reserved for operator specific use.

Network to MS Direction:
　0001H (P-CSCF IPv6 Address);
　0002H (IM CN Subsystem Signaling Flag);
　0003H (DNS Server IPv6 Address);
　0004H (Policy Control rejection code);
　0005H (Selected Bearer Control Mode;
　0006H (Reserved);
　0007H (DSMIPv6 Home Agent Address);
　0008H (DSMIPv6 Home Network Prefix);
　0009H (DSMIPv6 IPv4 Home Agent Address);
　000AH Reserved);
　000BH (Reserved);

000CH (P-CSCF IPv4 Address);
000DH (DNS Server IPv4 Address);
000EH (MSISDN);
000FH (IFOM-Support);
0010H (IPv4 Link MTU);
0011H (Bearer CSFB PS HO Preference Network); and
FF00H to FFFFH reserved for operator specific use.

If the additional parameters list contains a container identifier that is not supported by the receiving entity the corresponding unit shall be discarded.

The container identifier field is encoded as the protocol identifier field and the length of container identifier contents field is encoded as the length of the protocol identifier contents field.

When the container identifier indicates P-CSCF IPv6 Address Request, DNS Server IPv6 Address Request, or MSISDN Request, the container identifier contents field is empty and the length of container identifier contents indicates a length equal to zero. If the container identifier contents field is not empty, it shall be ignored.

When the container identifier indicates IM CN Subsystem Signaling Flag (see 3GPP TS 24.229 [95]), the container identifier contents field is empty and the length of container identifier contents indicates a length equal to zero. If the container identifier contents field is not empty, it shall be ignored. In Network to MS direction this information may be used by the MS to indicate to the user whether the requested dedicated signalling PDP context was successfully established.

When the container identifier indicates P-CSCF IPv6 Address, the container identifier contents field contains one IPv6 address corresponding to a P-CSCF address (see 3GPP TS 24.229 [95]). This IPv6 address is encoded as an 128-bit address according to RFC 3513 [99]. When there is need to include more than one P-CSCF address, then more logical units with container identifier indicating P-CSCF Address are used.

When the container identifier indicates DNS Server IPv6 Address, the container identifier contents field contains one IPv6 DNS server address (see 3GPP TS 27.060 [36a]). This IPv6 address is encoded as an 128-bit address according to RFC 3513 [99]. When there is need to include more than one DNS server address, then more logical units with container identifier indicating DNS Server Address are used.

When the container identifier indicates Policy Control rejection code, the container identifier contents field contains a Go interface related cause code from the GGSN to the MS (see 3GPP TS 29.207 [100]). The length of container identifier contents indicates a length equal to one. If the container identifier contents field is empty or its actual length is greater than one octect, then it shall be ignored by the receiver.

When the container identifier indicates MS Support of Network Requested Bearer Control indicator, the container identifier contents field is empty and the length of container identifier contents indicates a length equal to zero. If the container identifier contents field is not empty, it shall be ignored.

When the container indicates Selected Bearer Control Mode, the container identifier contents field contains the selected bearer control mode, where '01H' indicates that 'MS only' mode has been selected and '02H' indicates that 'MS/NW' mode has been selected. The length of container identifier contents indicates a length equal to one. If the container identifier contents field is empty or its actual length is greater than one octet, then it shall be ignored by the receiver.

When the container identifier indicates DSMIPv6 Home Agent Address Request, the container identifier contents field is empty and the length of container identifier contents indicates a length equal to zero. If the container identifier contents field is not empty, it shall be ignored.

When the container identifier indicates DSMIPv6 Home Network Prefix Request, the container identifier contents field is empty and the length of container identifier contents indicates a length equal to zero. If the container identifier contents field is not empty, it shall be ignored.

When the container identifier indicates DSMIPv6 IPv4 Home Agent Address Request, the container identifier contents field is empty and the length of container identifier contents indicates a length equal to zero. If the container identifier contents field is not empty, it shall be ignored.

When the container identifier indicates DSMIPv6 Home Agent Address, the container identifier contents field contains one IPv6 address corresponding to a DSMIPv6 HA address (see 3GPP TS 24.303 [124] and 3GPP TS 24.327 [125]). This IPv6 address is encoded as an 128-bit address according to IETF RFC 3513 [99].

When the container identifier indicates DSMIPv6 Home Network Prefix, the container identifier contents field contains one IPv6 Home Network Prefix (see 3GPP TS 24.303 [124] and 3GPP TS 24.327 [125]). This IPv6 prefix is encoded as an IPv6 address according to RFC 3513 [99] followed by 8 bits which specifies the prefix length.

When the container identifier indicates DSMIPv6 IPv4 Home Agent Address, the container identifier contents field contains one IPv4 address corresponding to a DSMIPv6 IPv4 Home Agent address (see 3GPP TS 24.303 [124] and 3GPP TS 24.327 [125]).

When the container identifier indicates P-CSCF IPv4 Address Request, the container identifier contents field is empty and the length of container identifier contents indicates a length equal to zero. If the container identifier contents field is not empty, it shall be ignored.

When the container identifier indicates DNS Server IPv4 Address Request, the container identifier contents field is empty and the length of container identifier contents indicates a length equal to zero. If the container identifier contents field is not empty, it shall be ignored.

When the container identifier indicates P-CSCF IPv4 address, the container identifier contents field contains one IPv4 address corresponding to the P-CSCF address to be used.

When the container identifier indicates DNS Server IPv4 Address, the container identifier contents field contains one IPv4 address corresponding to the DNS server address to be used. P-CSCF IPv4 Address Request, P-CSCF IPv4 Address, DNS Server IPv4 Address Request and DNS Server IPv4 Address are applicable only in S1-mode.

When the container identifier indicates IP address allocation via NAS signalling, the container identifier contents field is empty and the length of container identifier contents indicates a length equal to zero. If the container identifier contents field is not empty, it shall be ignored.

When the container identifier indicates IP address allocation via DHCPv4, the container identifier contents field is empty and the length of container identifier contents indicates a length equal to zero. If the container identifier contents field is not empty, it shall be ignored.

When the container identifier indicates MSISDN, the container identifier contents field contains the MSISDN (see 3GPP TS 15 23.003 [10]) assigned to the MS. Use of the MSISDN provided is defined in subclause 6.4.

When the container identifier indicates IFOM Support Request (see 3GPP TS 24.303 [124] and 3GPP TS 24.327 [125]), the container identifier contents field is empty and the length of container identifier contents indicates a length equal to zero. If the container identifier contents field is not empty, it shall be ignored.

When the container identifier indicates IFOM Support, the container identifier contents field is empty and the length of container identifier contents indicates a length equal to zero. If the container identifier contents field is not empty, it shall be ignored. This information indicates that the Home Agent supports IFOM.

When the container identifier indicates IPv4 Link MTU Request, the container identifier contents field is empty and the length of container identifier contents indicates a length equal to zero. If the container identifier contents field is not empty, it shall be ignored.

When the container identifier indicates IPv4 Link MTU, the length of container identifier contents indicates a length equal to two. The container identifier contents field contains the binary coded representation of the IPv4 link MTU size in octets. Bit 8 of the first octet of the container identifier contents field contains the most significant bit and bit 1 of the second octet of the container identifier contents field contains the least significant bit. If the length of container identifier contents is different from two octets, then it shall be ignored by the receiver.

When the container identifier indicates Bearer CSFB PS HO Preference MS, the container identifier contents field is encoded as described in FIG. A.B.C.D.1 and Table A.B.C.D.1. Bearer CSFB PS HO Preference Network. When the container identifier indicates Bearer CSFB PS HO Preference Network, the container identifier contents field is encoded as described in FIG. A.B.C.D.1 and Table A.B.C.D.1.

When the container identifier indicates operator specific use, the Container contents starts with MCC and MNC of the operator providing the relevant application and can be followed by further application specific information. The coding of MCC and MNC is as in octet 2 to 4 of the Location Area Identification information element in subclause 10.5.1.3.'

NOTE 1: The additional parameters list and the configuration protocol options list are logically separated since they carry different type of information. The beginning of the additional parameters list is marked by a logical unit, which has an identifier (i.e. the first two octets) equal to a container identifier (i.e. it is not a protocol identifier).

FIG. 23 shows an example preserved EPS Bearers indication information element table. Table A.B.C.D.1 [below] may be added to the specification to provide the following description of the bits in the information element of FIG. 23.

TABLE A.B.C.D.1

Bit 1 to 5 of octet 3 are spare and shall be coded as zero
EPS Bearer identity value 7 (octet 3, bit 8)
0 Preference is to keep corresponding EPS bearer, indicated by the EPS bearer identity value, in 3GPP access
1 Preference is to keep corresponding EPS bearer, indicated by the EPS bearer identity value, in non-3GPP access
EPS Bearer identity value 6 (octet 3, bit 7)
0 Preference is to keep corresponding EPS bearer, indicated by the EPS bearer identity value, in 3GPP access
1 Preference is to keep corresponding EPS bearer, indicated by the EPS bearer identity value, in non-3GPP access
EPS Bearer identity value 5 (octet 3, bit 6)
0 Preference is to keep corresponding EPS bearer, indicated by the EPS bearer identity value, in 3GPP access
1 Preference is to keep corresponding EPS bearer, indicated by the EPS bearer identity value, in non-3GPP access
EPS Bearer identity value 15 (octet 4, bit 8)

TABLE A.B.C.D.1-continued

0 Preference is to keep corresponding EPS bearer, indicated by the EPS bearer identity value, in 3GPP access
1 Preference is to keep corresponding EPS bearer, indicated by the EPS bearer identity value, in non-3GPP access
EPS Bearer identity value 14 (octet 4, bit 7)
0 Preference is to keep corresponding EPS bearer, indicated by the EPS bearer identity value, in 3GPP access
1 Preference is to keep corresponding EPS bearer, indicated by the EPS bearer identity value, in non-3GPP access
EPS Bearer identity value 13 (octet 4, bit 6)
0 Preference is to keep corresponding EPS bearer, indicated by the EPS bearer identity value, in 3GPP access
1 Preference is to keep corresponding EPS bearer, indicated by the EPS bearer identity value, in non-3GPP access
EPS Bearer identity value 12 (octet 4, bit 5)
0 Preference is to keep corresponding EPS bearer, indicated by the EPS bearer identity value, in 3GPP access
1 Preference is to keep corresponding EPS bearer, indicated by the EPS bearer identity value, in non-3GPP access
EPS Bearer identity value 11 (octet 4, bit 4)
0 Preference is to keep corresponding EPS bearer, indicated by the EPS bearer identity value, in 3GPP access
1 Preference is to keep corresponding EPS bearer, indicated by the EPS bearer identity value, in non-3GPP access
EPS Bearer identity value 10 (octet 4, bit 3)
0 Preference is to keep corresponding EPS bearer, indicated by the EPS bearer identity value, in 3GPP access
1 Preference is to keep corresponding EPS bearer, indicated by the EPS bearer identity value, in non-3GPP access
EPS Bearer identity value 9 (octet 4, bit 2)
0 Preference is to keep corresponding EPS bearer, indicated by the EPS bearer identity value, in 3GPP access
1 Preference is to keep corresponding EPS bearer, indicated by the EPS bearer identity value, in non-3GPP access
EPS Bearer identity value 8 (octet 4, bit 1)
0 Preference is to keep corresponding EPS bearer, indicated by the EPS bearer identity value, in 3GPP access
1 Preference is to keep corresponding EPS bearer, indicated by the EPS bearer identity value, in non-3GPP access In one example, standard 3GPP TS 29.060 may be modified as shown below to facilitate to the MME to Core Network interaction described above.

[3GPP TS 29.060]6.1 Extension Headers
6.1.2 Suspend Request

This extension header is transmitted at inter-SGSN handover, when a DTM capable MS has an ongoing circuit call and it moves to a cell that does not support DTM, under the domain of a new 2G SGSN. This extension header is transmitted also when the MME needs to indicate to the S-GW that certain EPS bearers need to be preserved from handover to the target system during a PS handover for MO/MT CSFB services, as defined in 3GPP TS 23.272. When the new SGSN receives a "SUSPEND" message from the BSS, it sends a SGSN context request with this additional extension header to the old SGSN. When the MME receives an indication the UE that EPS bearers need to be preserved from handover to the target system, it sends a SGSN context request with this additional header to the S-GW and shall include the Preserved EPS Bearer extension header described in subclause 6.1.6. When the S-GW receives a SGSN context request with this additional extension header and with the Preserved EPS Bearer extension header described in subclause 6.1.3, the S-GW sends a SGSN context request to the PDN GW with this additional header to the S-GW and shall include the Preserved EPS Bearer extension header described. The old SGSN/P-GW/S-GW shall reply with a SGSN context response, including the Extension Header described in subclause 6.1.3. The SGSN Context Request message shall not be handled other than for the case of implementing the Suspend functionality as described in 3GPP TS 23.060 [4]. The "SGSN context request" message shall not include the "IMSI", "packet-TMSI" and "MS validated" IEs.

6.1.3 Suspend Response

When a SGSN receives a SGSN Context Request with the extension header "Suspend Request" described in subclause 6.1.2, it shall perform the actions specified in 3GPP TS 23.060 [4] and it shall return a SGSN Context Response with this extension header included. When a S-GW or PDN GW receives a SGSN Context Request with the extension header "Suspend Request" described in subclause 6.1.2 and the Preserved EPS Bearer extension header described in subclause 6.1.3, it shall perform the actions specified in 3GPP TS 23.272 and it shall return a SGSN Context Response with this extension header included. The SGSN Context Response message shall not be handled other than for the purpose of implementing the Suspend functionality as described in 3GPP TS 23.060 [4]. The "SGSN context response" shall not include the "IMSI", "Radio priority SMS", "Radio priority", "packet flow ID", "MM context", "PDP context" and "SGSN Address for control plane" IEs.

In one example a table, such as the table shown in FIG. 24, may be added to the standard to show preserved EPS bearers indication extension headers, which are described below in conjunction with text that would be added to the standard. The definitions of the headers are shown in Table 6.1.6/1 [below].

6.1.6 Preserved EPS Bearers Indication

This extension header shall be included by an MME in all SGSN context request messages containing the Suspend Request extension header if the MME MME needs to indicate to the S-GW that certain EPS bearers need to be preserved from handover to the target system during a PS handover for MO/MT CSFB services, as defined in 3GPP TS 23.272, or when the MME receives an indication from the UE that EPS bearers need to be reserved from handover to the target system. The MME shall include in this extension header the EPS bearer identities received by the UE. This extension header shall be included by an S-GW in all SGSN context request messages containing the Suspend Request extension header if the S-GW received an SGSN context request message containing the Suspend Request extension header and the Preserved EPS Bearers extension header.

TABLE 6.1.6/1

Preserved EPS Bearers Indication Extension Header

EBI(x) shall be coded as follows:
EBI(0)-EBI(4):
Bits 0 to 4 of octet 3 are spare and shall be coded as zero.
EBI(5)-EBI(15):
0 indicates that the corresponding EPS hearer context can be handed over to GERAN/UTRAN and can be deactivated by the MME upon triggering the handover to GERAN/UTRAN for CSFB.
1 indicates that the corresponding EPS bearer context shall not be handed over to GERAN/UTRAN and shall be from handover to the target system by the MME.

Differentiating RAT Preferences

To facilitate the identification of RAT preferences for use with CSFB, the following standardization changes may be made, with reference to FIG. 25.

9.9.x.y CSFB PS HO Reference

The purpose of the CSFB PS HO preference information element is to indicate the PS HO preference in CSFB of each EPS bearer context that can be identified by an EPS bearer identity. The CSFB PS HO preferences information element is coded as shown in FIG. 9.9.x.y.z [FIG. 25] and table 9.9.x.y.z [below]. The CSFB PS HO preference information element is a type 4 information element with 4 octets length.

A table may also be added to the standard to specify characteristics of the information element as provided below.

TABLE 9.9.x.y.z

CSFB PS HO preference information element

Bit 1 to 8 of octet 3 and bit 1 and 2 of octet 4 are spare and shall be coded as zero
EPS Bearer identity value 7 (octet 4, bit 8 and 7)
0 0 Preference is to keep corresponding EPS bearer, indicated by the EPS bearer identity value, in GERAN or UTRAN access
0 1 Preference is to keep corresponding EPS bearer, indicated by the EPS bearer identity value, in GERAN access
1 0 Preference is to keep corresponding EPS bearer, indicated by the EPS bearer identity value, in UTRAN access
1 1 Preference is to keep corresponding EPS bearer, indicated by the EPS bearer identity value, in non-3GPP access
EPS Bearer identity value 6 (octet 4, bit 6 and 5)
0 0 Preference is to keep corresponding EPS bearer, indicated by the EPS bearer identity value, in GERAN or UTRAN access
0 1 Preference is to keep corresponding EPS bearer, indicated by the EPS bearer identity value, in GERAN access
1 0 Preference is to keep corresponding EPS bearer, indicated by the EPS bearer identity value, in UTRAN access
1 1 Preference is to keep corresponding EPS bearer, indicated by the EPS bearer identity value, in non-3GPP access
EPS Bearer identity value 5 (octet 4, bit 4 and 3)
0 0 Preference is to keep corresponding EPS bearer, indicated by the EPS bearer identity value, in GERAN or UTRAN access
0 1 Preference is to keep corresponding EPS bearer, indicated by the EPS bearer identity value, in GERAN access
1 0 Preference is to keep corresponding EPS bearer, indicated by the EPS bearer identity value, in UTRAN access
1 1 Preference is to keep corresponding EPS bearer, indicated by the EPS bearer identity value, in non-3GPP access
EPS Bearer identity value 11 (octet 5, bit 8 and 7)
0 0 Preference is to keep corresponding EPS bearer, indicated by the EPS bearer identity value, in GERAN or UTRAN access
0 1 Preference is to keep corresponding EPS bearer, indicated by the EPS bearer identity value, in GERAN access
1 0 Preference is to keep corresponding EPS bearer, indicated by the EPS bearer identity value, in UTRAN access
1 1 Preference is to keep corresponding EPS bearer, indicated by the EPS bearer identity value, in non-3GPP access
EPS Bearer identity value 10 (octet 5, bit 6 and 5)
0 0 Preference is to keep corresponding EPS bearer, indicated by the EPS bearer identity value, in GERAN or UTRAN access
0 1 Preference is to keep corresponding EPS bearer, indicated by the EPS bearer identity value, in GERAN access
1 0 Preference is to keep corresponding EPS bearer, indicated by the EPS bearer identity value, in UTRAN access
1 1 Preference is to keep corresponding EPS bearer, indicated by the EPS bearer identity value, in non-3GPP access
EPS Bearer identity value 9 (octet 5, bit 4 and 3)
0 0 Preference is to keep corresponding EPS bearer, indicated by the EPS bearer identity value, in GERAN or UTRAN access
0 1 Preference is to keep corresponding EPS bearer, indicated by the EPS bearer identity value, in GERAN access
1 0 Preference is to keep corresponding EPS bearer, indicated by the EPS bearer identity value, in UTRAN access
1 1 Preference is to keep corresponding EPS bearer, indicated by the EPS bearer identity value, in non-3GPP access
EPS Bearer identity value 8 (octet 5, bit 2 and 1)
0 0 Preference is to keep corresponding EPS bearer, indicated by the EPS bearer identity value, in GERAN or UTRAN access
0 1 Preference is to keep corresponding EPS bearer, indicated by the EPS bearer identity value, in GERAN access
1 0 Preference is to keep corresponding EPS bearer, indicated by the EPS bearer identity value, in UTRAN access
1 1 Preference is to keep corresponding EPS bearer, indicated by the EPS bearer identity value, in non-3GPP access
EPS Bearer identity value 15 (octet 6, bit 8 and 7)
0 0 Preference is to keep corresponding EPS bearer, indicated by the EPS bearer identity value, in GERAN or UTRAN access
0 1 Preference is to keep corresponding EPS bearer, indicated by the EPS bearer identity value, in GERAN access
1 0 Preference is to keep corresponding EPS bearer, indicated

TABLE 9.9.x.y.z-continued

CSFB PS HO preference information element by the EPS bearer identity value, in UTRAN access
1 1 Preference is to keep corresponding EPS bearer, indicated
by the EPS bearer identity value, in non-3GPP access
EPS Bearer identity value 14 (octet 6, bit 6 and 5)
0 0 Preference is to keep corresponding EPS bearer, indicated
by the EPS bearer identity value, in GERAN or UTRAN access
0 1 Preference is to keep corresponding EPS bearer, indicated
by the EPS bearer identity value, in GERAN access
1 0 Preference is to keep corresponding EPS bearer, indicated
by the EPS bearer identity value, in UTRAN access
1 1 Preference is to keep corresponding EPS bearer, indicated
by the EPS bearer identity value, in non-3GPP access
EPS Bearer identity value 13(octet 6, bit 4 and 3)
0 0 Preference is to keep corresponding EPS bearer, indicated
by the EPS bearer identity value, in GERAN or UTRAN access
0 1 Preference is to keep corresponding EPS bearer, indicated
by the EPS bearer identity value, in GERAN access
1 0 Preference is to keep corresponding EPS bearer, indicated
by the EPS bearer identity value, in UTRAN access
1 1 Preference is to keep corresponding EPS bearer, indicated
by the EPS bearer identity value, in non-3GPP access
EPS Bearer identity value 12 (octet 6, bit 2 and 1)
0 0 Preference is to keep corresponding EPS bearer, indicated
by the EPS bearer identity value, in GERAN or UTRAN access
0 1 Preference is to keep corresponding EPS bearer, indicated
by the EPS bearer identity value, in GERAN access
1 0 Preference is to keep corresponding EPS bearer, indicated
by the EPS bearer identity value, in UTRAN access
1 1 Preference is to keep corresponding EPS bearer, indicated
by the EPSbearer identity value, in non-3GPP access.

9.9.X.Y Preserved EPS Bearers

The purpose of the Preserved EPS Bearers information element is to indicate which EPS bearer contexts that should not be handed over to GERAN or UTRAN and should not be deactivated by the MME. The Preserved EPS Bearers information element is coded as shown in FIG. 9.9.X.Y.1 [FIG. 26] and table 9.9.X.Y.1 [below]. The Preserved EPS Bearers information element is a type 4 information element with 4 octets length.

TABLE 9.9.X.Y.1

Preserved EPS Bearers indication information element

Bit 1 to 8 of octet 3 and bit 1 and 2 of octet 4 are spare and shall be coded as zero
EPS Bearer identity value 7 (octet 4, bit 8 and 7)
0 0 Corresponding EPS bearer, indicated by the EPS bearer identity value, can be handed over to GERAN or UTRAN as part of CS fallback
0 1 Corresponding EPS bearer, indicated by the EPS bearer identity value, can be handed over to GERAN but not UTRAN as part of CS fallback
1 0 Corresponding EPS bearer, indicated by the EPS bearer identity value, can be handed over to UTRAN but not GERAN as part of CS fallback
1 1 Corresponding EPS bearer, indicated by the EPS bearer identity value, shall not be handed over to GERAN or UTRAN as part of CS fallback but be preserved within E-UTRAN system
EPS Bearer identity value 6 (octet 4, bit 6 and 5)
0 0 Corresponding EPS bearer, indicated by the EPS bearer identity value, can be handed over to GERAN or UTRAN as part of CS fallback
0 1 Corresponding EPS bearer, indicated by the EPS bearer identity value, can be handed over to GERAN but not UTRAN as part of CS fallback
1 0 Corresponding EPS bearer, indicated by the EPS bearer identity value, can be handed over to UTRAN but not GERAN as part of CS fallback
1 1 Corresponding EPS bearer, indicated by the EPS bearer identity value, shall not be handed over to GERAN or UTRAN as part of CS fallback but be preserved within E-UTRAN system
EPS Bearer identity value 5 (octet 4, bit 4 and 3)
0 0 Corresponding EPS bearer, indicated by the EPS bearer identity value, can be handed over to GERAN or UTRAN as part of CS fallback
0 1 Corresponding EPS bearer, indicated by the EPS bearer identity value, can be handed over to GERAN but not UTRAN as part of CS fallback
1 0 Corresponding EPS bearer, indicated by the EPS bearer identity value, can be handed over to UTRAN but not GERAN as part of CS fallback
1 1 Corresponding EPS bearer, indicated by the EPS bearer identity value, shall not be handed over to GERAN or UTRAN as part of CS fallback but be preserved within E-UTRAN system
EPS Bearer identity value 11 (octet 5, bit 8 and 7)
0 0 Corresponding EPS bearer, indicated by the EPS bearer identity value, can be handed over to GERAN or UTRAN as part of CS fallback
0 1 Corresponding EPS bearer, indicated by the EPS bearer identity value, can be handed over to GERAN but not UTRAN as part of CS fallback
1 0 Corresponding EPS bearer, indicated by the EPS bearer identity value, can be handed over to UTRAN but not GERAN as part of CS fallback
1 1 Corresponding EPS bearer, indicated by the EPS bearer identity value, shall not be handed over to GERAN or UTRAN as part of CS fallback but be preserved within E-UTRAN system
EPS Bearer identity value 10 (octet 5, bit 6 and 5)
0 0 Corresponding EPS bearer, indicated by the EPS bearer identity value, can be handed over to GERAN or UTRAN as part of CS fallback
0 1 Corresponding EPS bearer, indicated by the EPS bearer identity value, can be handed over to GERAN but not UTRAN as part of CS fallback
1 0 Corresponding EPS bearer, indicated by the EPS bearer identity value, can be handed over to UTRAN but not GERAN as part of CS fallback
1 1 Corresponding EPS bearer, indicated by the EPS bearer identity value, shall not be handed over to GERAN or UTRAN as part of CS fallback but be preserved within E-UTRAN system
EPS Bearer identity value 9 (octet 5, bit 4 and 3)
0 0 Corresponding EPS bearer, indicated by the EPS bearer identity value, can be handed over to GERAN or UTRAN as part of CS fallback
0 1 Corresponding EPS bearer, indicated by the EPS bearer identity value, can be handed over to GERAN but not UTRAN as part of CS fallback
1 0 Corresponding EPS bearer, indicated by the EPS bearer identity value, can be handed over to UTRAN but not GERAN as part of CS fallback
1 1 Corresponding EPS bearer, indicated by the EPS bearer identity value, shall not be handed over to GERAN or UTRAN as part of CS fallback but be preserved within E-UTRAN system
EPS Bearer identity value 8 (octet 5, bit 2 and 1)
0 0 Corresponding EPS bearer, indicated by the EPS bearer identity value, can be handed over to GERAN or UTRAN as part of CS fallback
0 1 Corresponding EPS bearer, indicated by the EPS bearer identity value, can be handed over to GERAN but not UTRAN as part of CS fallback
1 0 Corresponding EPS bearer, indicated by the EPS bearer identity value, can be handed over to UTRAN but not GERAN as part of CS fallback
1 1 Corresponding EPS bearer, indicated by the EPS bearer identity value, shall not be handed over to GERAN or UTRAN as part of CS fallback but be preserved within E-UTRAN system
EPS Bearer identity value 15 (octet 6, bit 8 and 7)
0 0 Corresponding EPS bearer, indicated by the EPS bearer identity value, can be handed over to GERAN or UTRAN as part of CS fallback
0 1 Corresponding EPS bearer, indicated by the EPS bearer identity value, can be handed over to GERAN but not UTRAN as part of CS fallback
1 0 Corresponding EPS bearer, indicated by the EPS bearer identity value, can be handed over to UTRAN but not GERAN as part of CS fallback
1 1 Corresponding EPS bearer, indicated by the EPS bearer identity value, shall not be handed over to GERAN or UTRAN as part of CS fallback but be preserved within E-UTRAN system
EPS Bearer identity value 14 (octet 6, bit 6 and 5)
0 0 Corresponding EPS bearer, indicated by the EPS bearer identity value, can be handed over to GERAN or UTRAN as part of CS fallback
0 1 Corresponding EPS bearer, indicated by the EPS bearer identity value, can be handed over to GERAN but not UTRAN as part of CS fallback
1 0 Corresponding EPS bearer, indicated by the EPS bearer identity value, can be handed over to UTRAN but not GERAN as part of CS fallback TABLE 9.9.X.Y.1-continued Preserved EPS Bearers indication information element 1 1 Corresponding EPS bearer, indicated by the EPS bearer identity value, shall not be handed over to GERAN or UTRAN as part of CS fallback but be preserved within E-UTRAN system
EPS Bearer identity value 13(octet 6, bit 4 and 3)
0 0 Corresponding EPS bearer, indicated by the EPS bearer identity value, can be handed over to GERAN or UTRAN as part of CS fallback
0 1 Corresponding EPS bearer, indicated by the EPS bearer identity value, can be handed over to GERAN but not UTRAN as part of CS fallback
1 0 Corresponding EPS bearer, indicated by the EPS bearer identity value, can be handed over to UTRAN but not GERAN as part of CS fallback
1 1 Corresponding EPS bearer, indicated by the EPS bearer identity value, shall not be handed over to GERAN or UTRAN as part of CS fallback but be preserved within E-UTRAN system
EPS Bearer identity value 12 (octet 6, bit 2 and 1)
0 0 Corresponding EPS bearer, indicated by the EPS bearer identity value, can be handed over to GERAN or UTRAN as part of CS fallback
0 1 Corresponding EPS bearer, indicated by the EPS bearer identity value, can be handed over to GERAN but not UTRAN as part of CS fallback
1 0 Corresponding EPS bearer, indicated by the EPS bearer identity value, can be handed over to UTRAN but not GERAN as part of CS fallback
1 1 Corresponding EPS bearer, indicated by the EPS bearer identity value, shall not be handed over to GERAN or UTRAN as part of CS fallback but be preserved within E-UTRAN system 6.6.2 Modifications to ANDSF Policies The ANDSF management object for the priority of the radio access technology, as described in the background information in section 2.4.1, is the Access Technology leaf. A modification is provided to add such leaf.

[3GPP TS 24.312]5.4.6 <X>/Policy/<X>/PrioritizedAccess/<X>/AccessTechnology

The AccessTechnology leaf indicates a prioritized access technology,

Occurrence: One
Format: int
Access Types: Get, Replace
Values: <Access technology>

Possible values for the Access technology are specified in table 5.4.6.1

TABLE 5.4.6.1

Possible values for the AccessTechnology leaf

| Value | Description |
|---|---|
| 0 | Reserved |
| 1 | 3GPP |
| 3 | WLAN |
| 4 | WiMAX |
| 5 | GERAN |
| 6 | UTRAN |
| 7-255 | Reserved |

If the value is "1", the UE shall consider any 3GPP access technology as prioritized. If the value is "5", the UE shall consider GERAN as prioritized. If the value is "6", the UE shall consider UTRAN as prioritized.

To implement the foregoing wherein there is a modification of indication of which bearers the UE wants to preserve based on WLAN availability, the following changes may be made.

TS 24.301 5.6.1.5 Service Request Procedure not Accepted by the Network

If the service request cannot be accepted, the network shall return a SERVICE REJECT message to the UE including an appropriate EMM cause value.

The MME may be configured to perform MME-based access control for mobile originating CS fallback calls for a certain area A by rejecting related service request with EMM cause #39 "CS service temporarily not available".

NOTE 1: Dependent on implementation and operator configuration the area A can be configured with the granularity of an MME area, tracking area or eNodeB service area.

The MME may further be configured for a certain area A' to exempt service requests for mobile originating CS fallback calls from this MME-based access control, if:

the service request is initiated in EMM-IDLE mode; and
the UE indicated support of eNodeB-based access control for mobile originating CS fallback calls during an attach or tracking area updating procedure.

NOTE 2: The operator can use this second option when the eNodeBs in area A' are supporting the eNodeBbased access control for CS fallback calls. The area A' can be part of area A or the whole area A. It is the responsibility of the operator to coordinate the activation of MME-based access control and eNodeB-based access control for mobile originating CS fallback calls.

When the EMM cause value is #39 "CS service temporarily not available", the MME shall include a value for timer T3442 in the SERVICE REJECT message. If a mobile terminating CS fallback call is aborted by the network during call establishment as specified in 3GPP TS 29.118 [16A], the MME shall include the EMM cause value #39 "CS service temporarily not available" and set the value of timer T3442 to zero.

If a service request is received from a UE with a LIPA PDN connection, and if:

a GW Transport Layer Address IE value identifying a L-GW is provided by the lower layer together with the service request, and the P-GW address included in the EPS bearer context of the LIPA PDN connection is different from the provided GW Transport Layer Address IE value (see 3GPP TS 36.413 [36]); or no GW Transport Layer Address is provided together with the service request by the lower layer, then if the UE did not include the CSFB PS HO Preference IE or the Preserved EPS Bearers IE in the EXTENDED SERVICE REQUEST message, then the MME locally deactivates all EPS bearer contexts associated with the LIPA PDN connection, otherwise the MME locally deactives only the EPS bearer contexts associated with the LIPA PDN connection that are not identified/contained in the CSFB PS HO Preference IE or the Preserved EPS Bearers IE. The MME shall send the SERVICE REJECT message if no active EPS bearer contexts remain for the UE. Depending on the service request received, the MME shall include the following EMM cause value in the SERVICE REJECT message:

if the service request received is not due to CS fallback, EMM cause value #10 "implicitly detached"; or if the service request received is due to CS fallback, EMM cause value #40 "no EPS bearer context activated". If the service request for mobile originated services is rejected due to NAS level congestion control, the network shall set the EMM cause value to #22 "congestion" and assign a back-off timer T3346.

The foregoing has many advantages and benefits. Release compatibility allows for a deterministic behavior on the UE side, since the UE is aware of whether the MME supports the new feature. The solution requires only changes to NAS signalling (changes that may be needed for other examples described herein). In a second embodiment, release compatibility allows for a deterministic behavior on the UE side, since the UE is aware of whether the MME supports the new feature. The solution requires changes to the S1 interface and to the AS to provide the new indication to the UE. However, with respect to the previous embodiment, this solution allows the UE to know exactly what bearers the UE can hand over to the non-3GPP access.

Explicit Bearer Indication from UE at CSFB Triggering enables the UE to provide information in real-time to the MME based on the preference, determined at the moment CSFB is required of which bearers should not be handed over to GERAN/UTRAN and should instead be handed over to non-3GPP. The UE can take benefit of real-time information regarding the non-3GPP access connectivity and provide the information only at CSFB triggering.

Network Triggered Handover to non-3GPP has the advantage that there is no need for explicit indications at the AS level between the network and the UE to inform the UE of which bearers have indeed been preserved from handover to the target system, since the network triggers the handover of the bearers preserved from handover to the target system (and only those).

Explicit Bearer Indication For Specific bearers enables the UE to provide the information to the network on a per-bearer level when bearers are created and modified. However, this requires the UE to maintain the appropriate information depending on the preferences in the UE, and either update the preferences or indicate to the network upon ESR whether the preferences should be used when the non-3GPP connectivity status changes.

Indication of bearers preserved from handover to the target system to UE in HO Command allows the UE to know for sure what bearers can be handed over to non-3GPP without requiring the UE to wait till the completion of the PS HO that is executed as part of the CSFB procedure.

Indication of CSFB allows for delay between the detection of the need to perform CSFB and the response indicating which EPS bearers should be preserved from handover to cellular RAT, thus delaying the triggering of CSFB. Other advantages and benefits exist.

Figure 27:
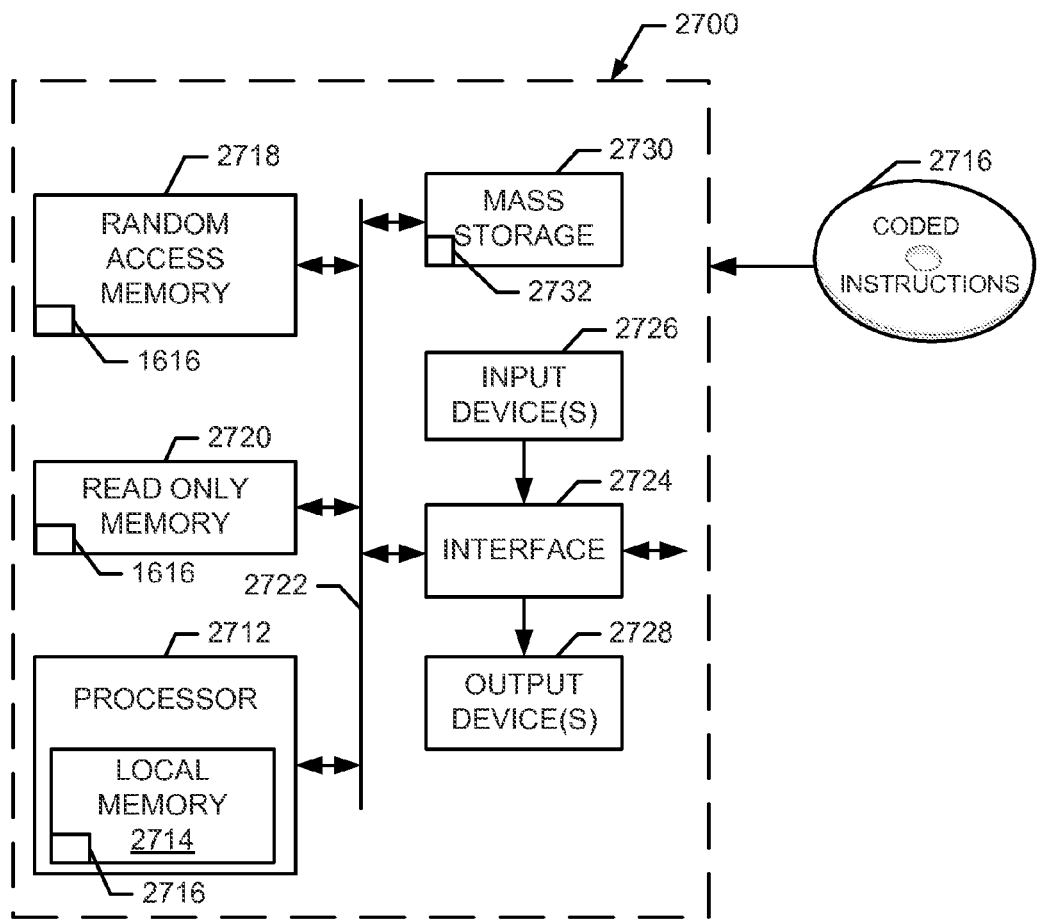
FIG. 27 is a diagram of example hardware that may carry out some of the processes described herein.

FIG. 27 is a block diagram of an example processing system 2700 capable of implementing the apparatus and methods disclosed herein. The processing system 2700 can correspond to, for example, a mobile station processing platform, a network element processing platform, a server, a personal computer, a personal digital assistant (PDA), an Internet appliance, a mobile phone, or any other type of computing device. For example the processing system 2700 may implement the UE 102 and any component of the mobile communication networks shown in FIG. 1 and FIG. 2.

The system 2700 of the instant example includes a processor 2712 such as a general purpose programmable processor, an embedded processor, a microcontroller, etc. The processor 2712 includes a local memory 2714, and executes coded instructions 2716 present in the local memory 2714 and/or in another memory device. The processor 2712 may execute, among other things, machine readable instructions to implement the processes represented in the drawings described above. The processor 2712 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 2712 is in communication with a main memory including a volatile memory 2718 and a non-volatile memory 2720 via a bus 2722. The volatile memory 2718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2720 may be implemented by flash memory and/or any other desired type of memory device. Access to the main memory 2718, 2720 is typically controlled by a memory controller (not shown).

The system 2700 also includes an interface circuit 2724. The interface circuit 2724 may be implemented by any type of interface standard, such as an Ethernet interface, a universal serial bus (USB), and/or a third generation input/output (3GIO) interface.

One or more input devices 2726 are connected to the interface circuit 2724. The input device(s) 2726 permit a user to enter data and commands into the processor 2712. The input device(s) can be implemented by, for example, a keyboard, a mouse, a touchscreen, a track-pad, a trackball, an isopoint and/or a voice recognition system.

One or more output devices 2728 are also connected to the interface circuit 2724. The output devices 2728 can be implemented, for example, by display devices (e.g., a liquid crystal display, a cathode ray tube display (CRT)), by a printer and/or by speakers. The interface circuit 2724, thus, typically includes a graphics driver card.

The interface circuit 2724 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

In some examples, the system 1100 also includes one or more non-transitory, computer-readable mass storage devices 2730 for storing software and data. Examples of such mass storage devices 2730 include floppy disk drives, hard drive disks, compact disk drives and digital versatile disk (DVD) drives.

As an alternative to implementing the methods and/or apparatus described herein in a system such as the device of FIG. 27, the methods and or apparatus described herein may be embedded in a structure such as a processor and/or an ASIC (application specific integrated circuit).

What is claimed is:

1. A method comprising:
   determining a set of access technologies available to a User Equipment (UE);
   identifying a WLAN access network from said set of access technologies;
   identifying a 3GPP RAT from said set of access technologies;
   prioritizing the WLAN access network type with respect to types of 3GPP RAT for a user plane handover during a circuit switch fall back (CSFB) procedure based at least in part on a target RAT in the CSFB procedure; and
   during the CSFB procedure, selecting one access technology from amongst said identified WLAN access network and said 3GPP RAT according to said prioritizing for the user plane handover.

2. The method of claim 1, further comprising:
   handing over user plane traffic to the selected access technology.

3. The method of claim 2, wherein the user plane traffic is an IP flow.

4. The method of claim 3, wherein the IP flow is identified by an IP 5-tuple.

5. The method of claim 3, wherein the IP flow is identified by an Access Point Name (APN).

6. The method of claim 2, wherein the user plane traffic is associated with a specific APN.

7. The method of claim 1, wherein the 3GPP RAT comprises E-UTRA, UTRA or GERAN.

8. The method of claim 1, wherein the UE determines the prioritized access technology type using a prioritized list of access technology types that are provided in an Access network discovery and selection function (ANDSF) management object.

9. The method of claim 2, wherein said handing over occurs after recognizing a handover event that changes said set of access technologies available to the UE.

10. The method of claim 1, wherein said prioritizing is based on a predetermined preference.

11. A user equipment (UE) method comprising:
identifying a WLAN access network;
identifying a 3GPP RAT;
prioritizing said WLAN access network with respect to said 3GPP RAT for a user plane handover during a circuit switch fall back (CSFB) procedure based at least in part on a target RAT in the CSFB procedure; and
during the CSFB procedure, selecting one access technology for routing user plane traffic from amongst said WLAN access network and 3GPP RAT according to said prioritizing.

12. The UE method of claim 11, further comprising:
indicating to a backhaul network the user plane handover.

13. The UE method of claim 11, wherein the UE prioritizes based on a prioritized list of access technology types that are provided in an Access network discovery and selection function (ANDSF) management object.

14. The UE method of claim 11, further comprising:
handing over said user plane traffic to the selected access technology.

15. The UE method of claim 14, wherein the user plane traffic is an IP flow.

16. The UE method of claim 11, wherein the 3GPP RAT comprises E-UTRA, UTRA or GERAN.

17. The UE method of claim 14, wherein said handing over occurs after:
recognizing a handover event that changes at least one of WLAN access network or said 3GPP RAT.

18. The UE method of claim 11, wherein said prioritizing is based on a predetermined preference.

* * * * *